US006859346B1

(12) United States Patent
Meyer

(10) Patent No.: US 6,859,346 B1
(45) Date of Patent: Feb. 22, 2005

(54) INTEGRATED BIDIRECTIONAL RECORDING HEAD MICROPOSITIONER FOR MAGNETIC STORAGE DEVICES

(76) Inventor: Dallas W. Meyer, 130 Alta Vista Way, Danville, CA (US) 94526

( * ) Notice: Subject to any disclaimer, the term of this patent is extended or adjusted under 35 U.S.C. 154(b) by 93 days.

(21) Appl. No.: 10/342,920

(22) Filed: Jan. 13, 2003

Related U.S. Application Data
(60) Provisional application No. 60/425,167, filed on Nov. 7, 2002.

(51) Int. Cl.[7] .............................................. G11B 5/56
(52) U.S. Cl. ............................. 360/294.5; 360/234.7; 360/294.7
(58) Field of Search ......................... 360/294.1, 394.7

(56) References Cited

U.S. PATENT DOCUMENTS

| | | | |
|---|---|---|---|
| 5,060,210 A | 10/1991 | Fennema et al. ............. 369/32 |
| 5,521,778 A | 5/1996 | Boutaghou et al. ......... 360/106 |
| 6,078,468 A | 6/2000 | Fiske .......................... 360/104 |
| 6,101,058 A | 8/2000 | Morris ......................... 360/69 |
| 6,262,868 B1 | 7/2001 | Arya et al. .................. 360/290 |
| 6,414,827 B1 | 7/2002 | Young et al. ........... 360/678.09 |
| 6,421,211 B1 | 7/2002 | Hawwa et al. ............ 360/294.4 |
| 6,452,755 B2 | 9/2002 | Bonin |
| 6,469,859 B1 | 10/2002 | Chainer et al. ............... 360/75 |
| 6,490,118 B1 | 12/2002 | Ell et al. ................. 360/77.04 |
| 6,493,177 B1 | 12/2002 | Ell et al. ................. 360/78.05 |
| 6,501,623 B1 | 12/2002 | Sassolini et al. |
| 6,535,360 B1 | 3/2003 | Kim et al. |
| 6,542,281 B2 | 4/2003 | Feldman et al. |
| 6,545,970 B2 | 4/2003 | Durnin et al. |
| 6,547,975 B1 | 4/2003 | Kobrin |
| 6,556,380 B2 | 4/2003 | Bunch et al. |
| 6,563,665 B1 | 5/2003 | Ell .......................... 360/78.05 |
| 6,594,119 B1 * | 7/2003 | Koshikawa et al. ..... 360/294.3 |
| 6,600,619 B1 | 7/2003 | Morris et al. ................. 360/75 |
| 6,600,634 B1 * | 7/2003 | Kim et al. ................ 360/294.5 |
| 6,611,399 B1 * | 8/2003 | Mei et al. ................. 360/234.7 |
| 6,633,451 B1 | 10/2003 | Chainer et al. ............... 360/75 |
| 6,747,836 B2 | 6/2004 | Stevens et al. .......... 360/78.05 |
| 6,768,610 B1 | 7/2004 | Morris et al. ............ 360/78.07 |
| 2003/0093894 A1 | 5/2003 | Dugas et al. |
| 2003/0161061 A1 | 8/2003 | Lamberts ...................... 360/31 |
| 2003/0197969 A1 | 10/2003 | Szita et al. ............... 360/77.08 |

OTHER PUBLICATIONS

Co–pending U.S. Appl. No. 10/342,615, filed Jan. 13, 2003, to Dallas W. Meyer, (43 pages), and 7 sheets of accompanying drawings. Note: In an Office Action mailed in this case on Aug. 25, 2004, claims 1–34 were rejected under 35 U.S.C. § 102 (e) by U.S. Appl. No. 6,768,610 to Morris, et al., and claims 35–42 were rejected under 35 U.S.C. § 103(a) by Morris, et al. in view of U.S. Appl. No. 6,078,468 to Fiske.

(List continued on next page.)

*Primary Examiner*—A. J. Heinz
(74) *Attorney, Agent, or Firm*—Workman Nydegger

(57) ABSTRACT

Transducer elements of recording heads for magnetic storage media are moved independently in either of two directions with respect to the slider of the recording head. The motion is controlled using a micropositioner having magnetic coils integrated into the recording head. The transducer moves in the x direction between data tracks and in the z direction perpendicular to the surface of the magnetic storage medium. The micropositioners are used for small-scale positioning of the transducers over data tracks and to adjust fly heights. Because of the high minimum resonant frequencies and the low mass of the transducers, the micropositioners also improve settling times associated with track following. The micropositioners can be used during fabrication for dimensional control of recording head components. The motion of the transducers in the z direction enables the recording heads to be used reliably in the presence of asperities and changing ambient pressures and temperatures.

37 Claims, 17 Drawing Sheets

OTHER PUBLICATIONS

Co-pending U.S. Appl. No. 10/775,406, filed Feb. 9, 2004, to Dallas W. Meyer.
Co-pending U.S. Appl. No. 10/728,561, filed Dec. 5, 2003, to Dallas W. Meyer.
Co-pending U.S. Appl. No. 10/794,482, filed Mar. 5, 2004, to Dallas W. Meyer.
Co-pending U.S. Appl. No. 10/818,641, filed Apr. 5, 2004, to Dallas W. Meyer.
Co-pending U.S. Appl. No. 10/900,713, filed Jul. 27, 2004, to Dallas W. Meyer.

* cited by examiner

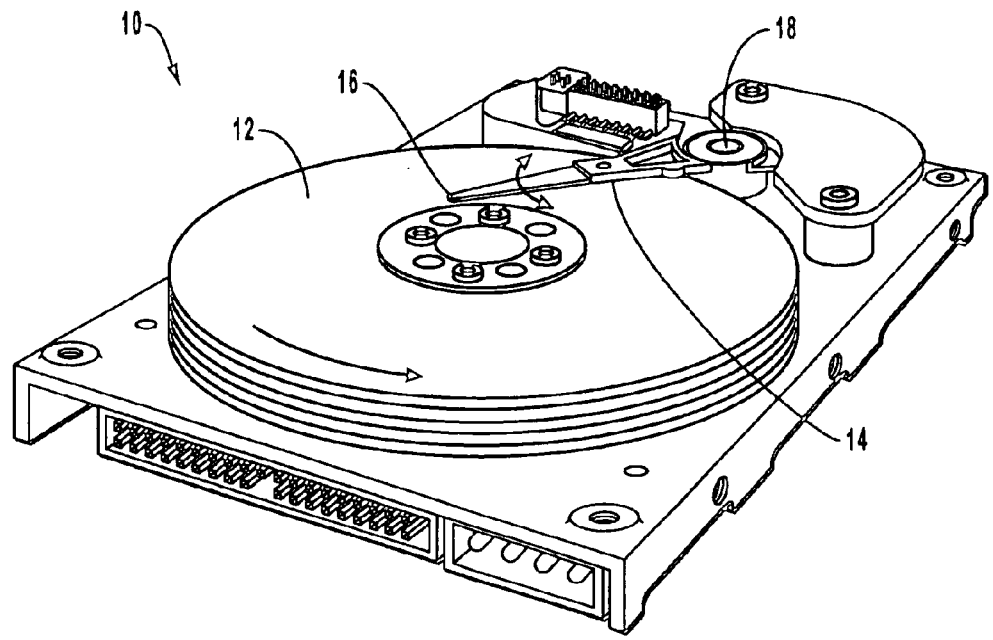
FIG. 1b
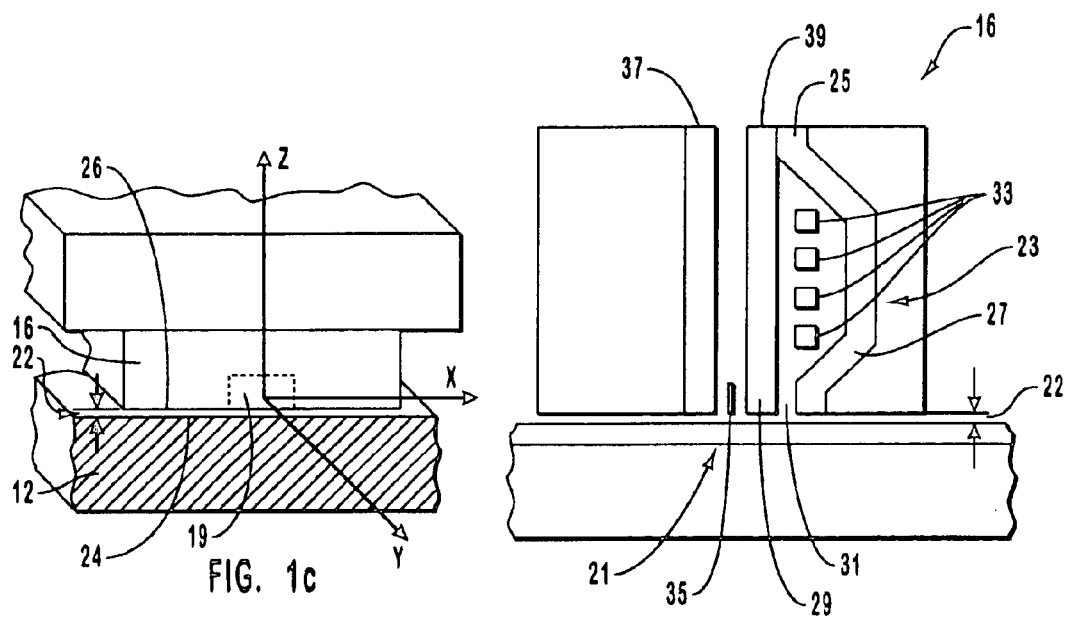
FIG. 1c
FIG. 1d

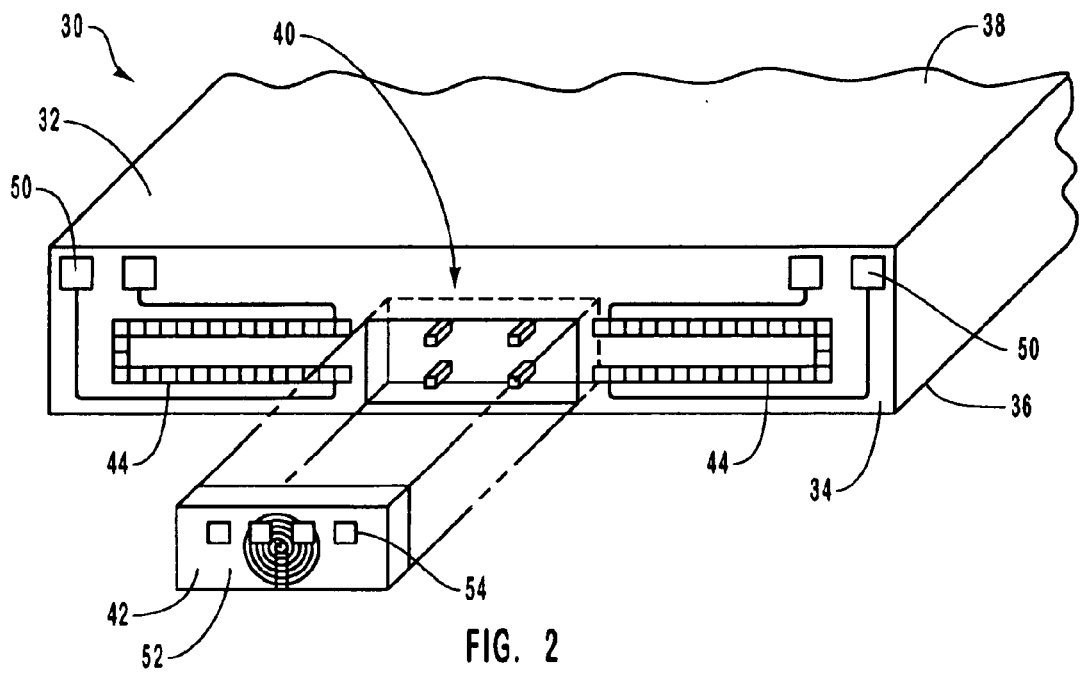
FIG. 2
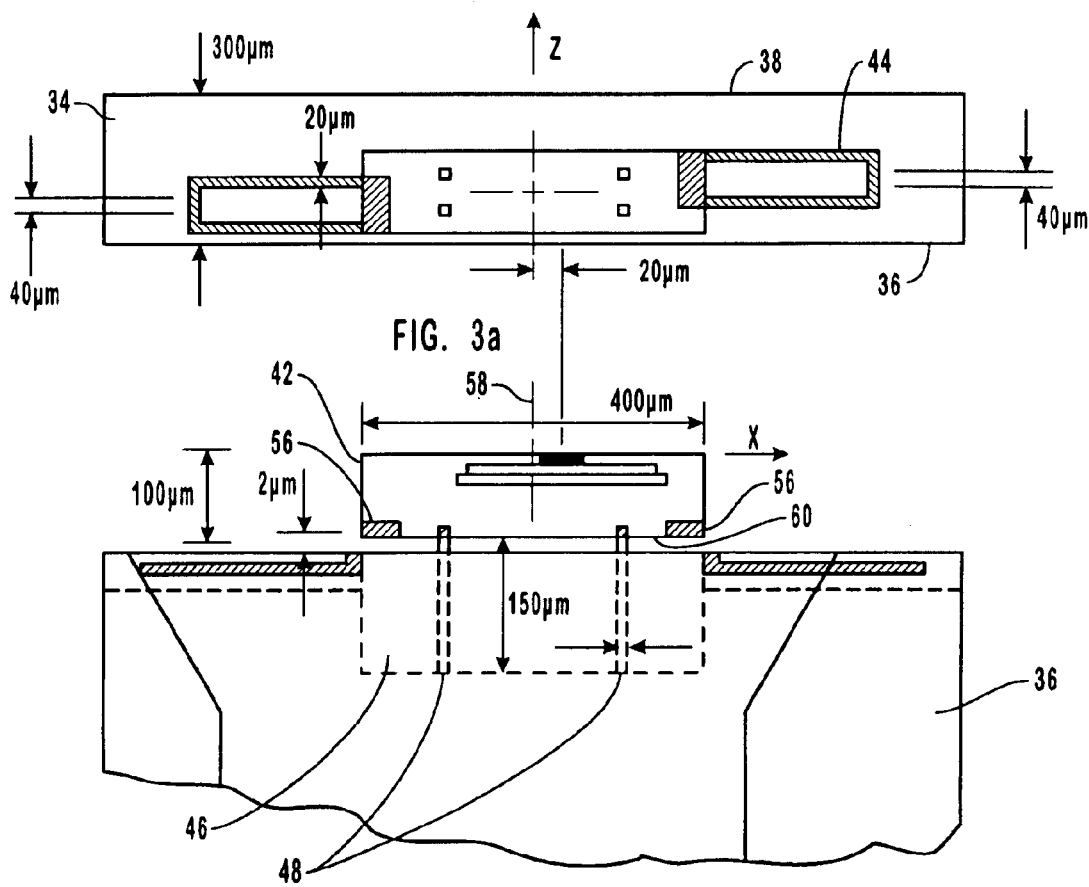
FIG. 3a
FIG. 3b

INTEGRATED BIDIRECTIONAL RECORDING HEAD MICROPOSITIONER FOR MAGNETIC STORAGE DEVICES

BACKGROUND OF THE INVENTION

1. Related Applications

This application claims the benefit of U.S. Provisional Patent Application Ser. No. 60/425,167, filed Nov. 7, 2002, entitled "Integrated Recording Head Micropositioner," which is incorporated herein by reference.

2. The Field of the Invention

The present invention relates to data storage on rotating magnetic storage devices. More specifically, the present invention relates to recording heads used with rotating magnetic storage devices in which a micropositioner reliably and rapidly controls the motion and position of a transducer element.

3. The Relevant Technology

During recent years, there has been a steady improvement in the volume of data that can be stored on magnetic storage media, such as hard disks drives used in computers. Today, a single 3.5 inch magnetic storage disk can store twenty gigabytes or more of data. At the same time, storage capacity per unit cost has fallen dramatically, which has enabled individual users and enterprises to radically change the way in which data is recorded and stored. Indeed, the ability to store large volumes of data inexpensively has been a driving factor in the information technology revolution during recent decades.

Conventional storage media include solid state devices, drive arrays (RAID), single rotating magnetic disk drives, and removable optical media. FIG. 1a is a graph that illustrates tradeoffs between performance and cost associated with typical storage media used in combination with computers. As shown, removable optical storage devices, such as optical read-only or read-write disks, generally provide the least expensive alternative for storing large amounts of data. However, single rotating magnetic devices, such as hard disk drives used in large numbers of personal computers, provide mass storage that is almost as cost effective as removable optical devices, but with better performance. In this context, the term "performance" relates primarily to the reliability and access times associated with the various storage media. As shown in FIG. 1a, however, the performance of single rotating magnetic storage devices is increasing less rapidly than the performance of RAID and solid state devices.

Although magnetic storage devices are widely used and have become significantly less expensive during recent years, a number of technological hurdles have been encountered, which threaten to reduce the rate at which future improvements in cost and performance will occur. FIG. 1b is a perspective view of a conventional magnetic storage device. Magnetic disk drive 10 includes a rotating magnetic storage medium 12, that, as mentioned above, can store tens of gigabytes of data in an area of only a few square inches. A head gimble assembly 14 ("HGA") positions a recording head 16 with a transducer in close proximity to the surface of the magnetic storage medium 12 to enable data to be read from and written to the storage medium. An actuator assembly 16 rotates the HGA 14 during operation to position the transducer of the recording head 16 at the proper location over the rotating magnetic storage medium 12.

One of the most significant problems that have arisen in the effort to improve capacity and performance in magnetic storage devices is track following, or the ability to quickly and reliably position the transducer of the recording head 16 over the appropriate track on the magnetic storage medium 12. In conventional devices, actuator assembly 18 includes a voice coil that uses a feedback loop based on servo tracks that are embedded between the data tracks on the magnetic storage medium 12. The track pitch in conventional devices is as low as 0.3 microns. At such small track pitches, non-repeatable motions of the rotating magnetic storage medium 12, the HGA 14, and the other mechanical components of disk drive 10 make it increasingly difficult to reliably follow the data tracks on the magnetic storage medium. For example, in devices having an HGA 14 with a length of 1.5 inches to the recording head 16 and a track pitch of 0.2 microns, the angular position of the head gimble assembly needs to have resolution better than 33 millionths of an arc second in order to adequately follow the tracks on the magnetic storage medium 12. Efforts to achieve adequate track following have included the use of smaller disks for high speed drives, fluid motors for improved damping, and active rotational feedback sensors using negative feedback algorithms. However, the use of such techniques can lead to either the loss of capacity or are only temporary solutions to this problem, as track pitches continue to decrease.

A closely related problem is that of the settling time and performance, which relates to the ability to stabilize the recording head over a track. The settling time is dictated by the inertial loads and the exciting resonant frequencies associated with the act of accessing a selected track, the amount of damping in the HGA 14 and the servo bandwidth. These factors are generally limited by the resonant frequencies in the arm of the HGA 14. Thus, settling times have not significantly improved in the last several generations of drives in view of the fundamental limitations on the mechanics of drives that use a recording head 16 controlled by an HGA 14 and an actuator assembly 18 as shown in FIG. 1b.

As the track pitch and the regions on magnetic media used to physically record bits of data have decreased, transducers in disk drives have been required to be positioned closer to the surface of the magnetic storage device. The distance between the transducer and the surface of the magnetic storage medium, referred to as the fly height, is now as small as 50 Angstroms in high capacity disk drives. The fly height is dictated by the fundamental resolution requirements associated with magnetic storage devices, which is a function of the track pitch and the size of the regions on which bits of data are physically recorded. If the fly height becomes too large during operation, the transducer becomes unable to resolve bits encoded in the storage medium. On the other hand, if the transducer is brought into physical contact with the optical storage medium, which can be traveling at speeds on the order of 100 miles per hour, both the transducer and the storage device can be damaged.

The fly height has been controlled in conventional devices by improving the manufacturing tolerances, by designing highly rigid and dampened HGA 14, and by the use of air bearings associated with the recording heads 16. The air bearing is the cushion or layer of air that develops between the surface of the magnetic storage medium and the adjacent surface of the transducer as the storage medium moves underneath the transducer.

As noted above, as the fly heights required in magnetic storage devices have decreased, the problem of transducer damage from excessive media contact has become more pronounced. Current giant magnetoresistance ("GMR") and tunneling magnetoresistance ("TMR") transducer heads are sensitive to being damaged if excessive contact with the storage medium is experienced. One related problem is that conventional transducer designs often lead to thermal pole tip protrusion, which occurs when the transducer is heated and the tip, or pole, of the transducer expends and protrudes beyond the plane of the transducer. Thermal pole tip protrusion can aggravate the contact of the transducer with the storage medium and can lead to increased or more rapid damage of the transducer.

These problems currently facing the magnetic storage device industry threaten to impede the ongoing progress in reliability, performance, and cost that has been achieved during recent years. Although many of these problems can be overcome to some degree using conventional head gimble assembly designs, it is unlikely that these problems can be successfully overcome while keeping costs for disk drive users down.

SUMMARY OF THE INVENTION

The present invention relates to a recording head for use with magnetic storage devices in which the recording head includes a micropositioner or actuator for controlling the position of the transducer in two directions. The recording heads of the invention are bifurcated into two discrete components, including a slider body and a transducer body. The slider body and the transducer body are movably connected one to another, such that the transducer body can move with respect to the slider body and, consequently, with respect to the magnetic storage medium.

A micropositioner integrated into the slider body controls the position and movement of the transducer body with respect to the slider body. In effect, the use of a micropositioner integrated into the slider body results in the small scale motion of the transducer being controlled at the recording head rather than at the actuator that controls the rotational motion of the entire head gimble assembly. Controlling the small scale motion in this manner provides several distinct and substantial advantages compared to conventional disk drives. For instance, the micropositioner in the recording head enables the transducer to be reliably positioned with respect to the tracks on the magnetic storage medium, thereby overcoming many of the problems associated with track following experienced in the industry. Because the resonant frequencies of the transducer body that is moved by the micropositioner can be as high as 30 kHz or higher, the transducers of invention can settle on a selected track much more quickly and reliably than those used in conventional disk drives. The ability to quickly settle onto a selected track and reliably stay on track represents a significant improvement over conventional devices, and permits the recording heads of the invention to be advantageously used with current storage media as well as higher density storage media that will be developed in the future.

The two directions of motion generated by the micropositioners of the invention include the x direction, which is defined to be parallel to the surface of the recording medium as well as perpendicular to the tracks, and the z direction, which is defined to be perpendicular to the surface of the recording medium. Control at the recording head of the z position of the transducer greatly enhances the ability to control the fly height of the transducer during operation. In contrast, conventional head gimble assemblies do not permit the recording head to be moved in the z direction. The ability to control the position of the transducer in the z direction is useful in combination with conventional magnetic storage media, as well as higher density storage media that will be developed in the future, in which the fly height will be even more critical.

Control of the transducer in the z direction enables a number of novel methods that enhance the use, initialization, and fabrication of disk drives and recording heads. For instance, the control of the transducer in the z direction permits the transducer to be displaced over asperities in the surface of a magnetic storage medium, thereby reducing media contact by the transducer and prolonging the life thereof. In addition, the z position of the transducer can be adjusted in response to temperature and pressure measurements, so as to maintain a desired fly height in different environmental conditions. Moreover, the micropositioners of the invention can be used to achieve desired dimensional tolerances of the recording heads themselves during the fabrication process.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which:

FIG. 1b is a top view of a conventional disk drive and head gimble assembly.

FIG. 1c is a perspective view of the conventional disk drive and head gimble assembly of FIG. 1a.

FIG. 1d illustrates the relative position of a transducer and the associated magnetic storage medium in the conventional disk drive and head gimble assembly of FIG. 1a.

FIG. 2 is a perspective view of a transducer body and slider body according to one embodiment of the invention.

FIG. 3a is a side view of the slider body of FIG. 2.

FIG. 3b is a bottom view of an assembly that includes the transducer body and the slider body of FIG. 2, showing the flexible posts that connect the transducer body to the slider body.

FIG. 6b is a side view of the assembly of FIG. 6a.

FIG. 7b is an end view of the assembly of FIG. 7a.

FIG. 8 is a side view of one embodiment of the electrical interconnection that can be used with the assembly of FIG. 4a.

FIG. 9 is a side view of a flip-chip embodiment of the electrical interconnection that can be used with the assembly of FIG. 4a.

DETAILED DESCRIPTION OF THE PREFERRED EMBODIMENTS

The present invention relates to recording heads having an integrated micropositioner for controlling the motion and position of transducer elements with respect to magnetic storage media. Micropositioners can be used to control the position of the transducer elements in either of two directions, which permits recording heads to be reliably used with existing recording media as well as with higher density recording media that will be developed in the future.

Figure 1A:
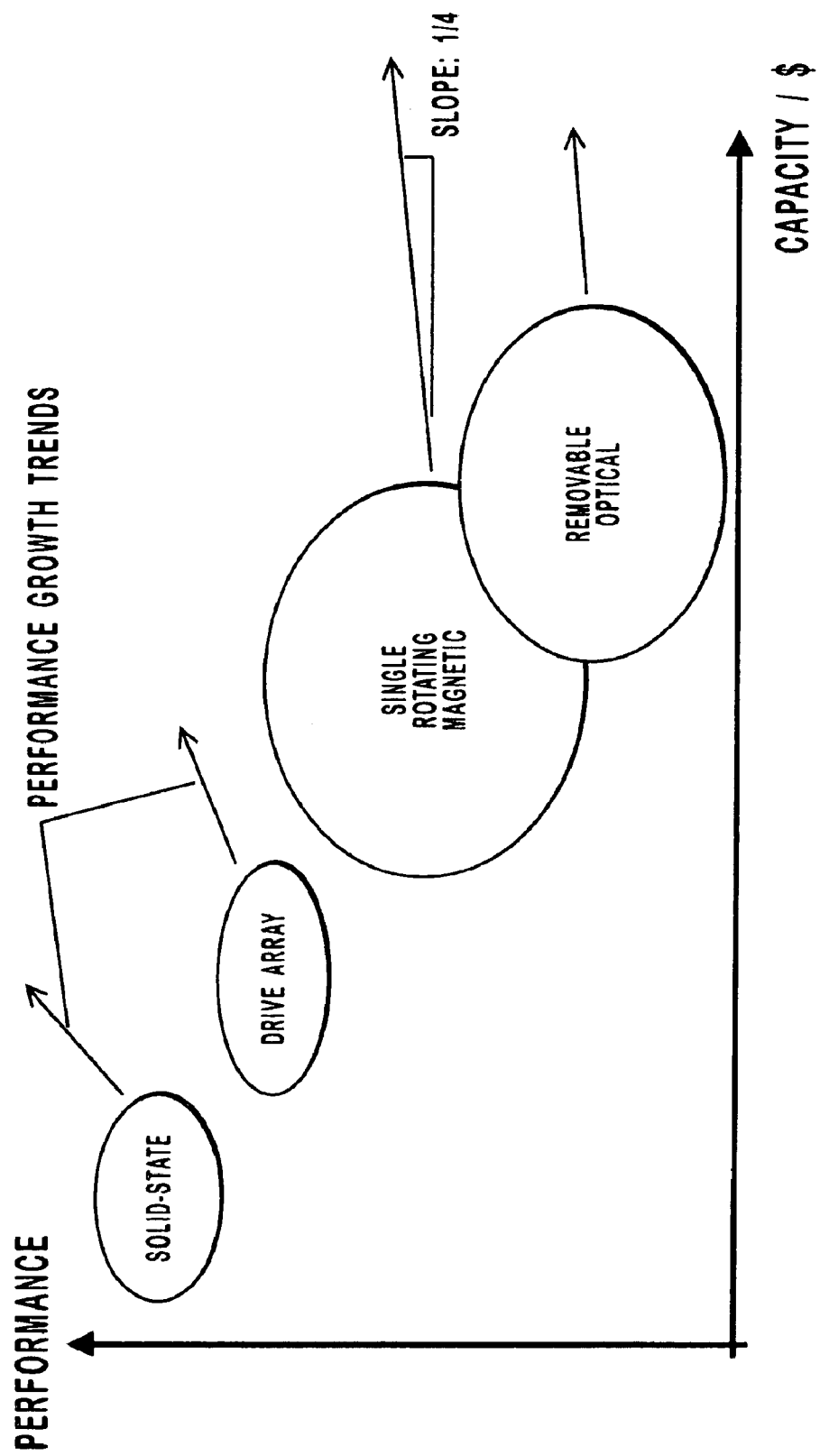
FIG. 1a is a graph that depicts relative cost and performance values of conventional data storage device technologies.

While FIGS. 1b and 1c illustrate conventional disk drives, these figures set forth a convention regarding the frame of reference that is useful in describing the operation of the recording heads of the invention. As shown in FIG. 1b, rotating magnetic storage medium 12 rotates counterclockwise, such that elements on the storage medium that encode individual bits of data travel under recording head 16 in a direction that is substantially parallel to the longitudinal axis of the arm of the head/gimble assembly 14. In other words, a particular track of the magnetic storage medium 12, which is concentric with the circumference of the magnetic storage medium, is substantially tangent to the longitudinal axis of head/gimble assembly 14 when the track is positioned under recording head 16. This motion of the magnetic storage medium 12 with respect to the head/gimble assembly 14 defines a trailing edge or surface of the recording head 16 that is distal from the axis of rotation of the head/gimble assembly 14.

FIG. 1c is an perspective view of the recording head, and shows an elevation of the trailing surface of the recording head 16. In FIG. 1c, the motion of the illustrated portion of the magnetic storage medium 12 during operation is generally in the y direction, while the orientation of the data tracks of this portion of the magnetic storage medium is likewise substantially in the y direction. As shown in FIG. 1c, the z direction is defined to be perpendicular to the surface of the magnetic storage medium 12. The x direction is defined to be substantially perpendicular to or lateral with respect to the orientation of the tracks. In other words, motion in the x direction can cause the transducer to be moved between tracks or to be centered over a track. Because of the small angles involved, the motion of the transducer can be considered to be translation in the x direction, regardless of whether the motion is a result of the actuation of the micropositioner integrated into the slider body of the recording head or motion associated with the rotation of the head/gimble assembly about the axis of rotation of the HGA. The y axis is defined to be perpendicular to both the x and z axes as shown in FIG. 1c.

FIG. 1c also illustrates the fly height 22, which is defined to be the distance in the z direction between the surface 24 of the magnetic storage medium 12 and the adjacent bottom, or air bearing, surface 26 of the recording head. Although the recording heads of the invention include various transducer bodies and associated transducers as will be discussed in greater detail below, FIG. 1c illustrates the general position of a transducer in region 19 and the relationship thereof to the x, y and z axes and the fly height 22.

A recording head of a conventional disk drive includes an integrated read head and write head. FIG. 1d shows a cross-section of a portion of recording head 16 taken in the x-z plane. Recording head 16 has an integrated read head 21 and write head 23. The write head 23 includes a magnetic element 25 having top pole 27 and a bottom pole 29 that are formed from a soft magnetic material and are separated from each other at one end by a gap 31 near surface 24 of the magnetic storage medium 12. A conductive coil 33 is wrapped around the magnetic element 25. FIG. 1d shows a cross-section of adjacent segments of the coil 33, which extend out of the page of FIG. 1d and are aligned generally in the y-z plane.

The top pole 27 and bottom pole 29 of the magnetic element 25 are electromagnetized when a current is conducted through coil 33, thereby forming a north and south pole. The magnetic field that is generated by the action of the top pole 27 and bottom pole 29 is concentrated near gap 31. As regions of the magnetic storage medium pass 12 under the gap, the regions are permanently magnetized. The polarity of the magnetized regions of the magnetic storage medium 12 are defined by the polarity of the magnetic element 25 and, in this manner, the binary information is encoded on the surface of the magnetic storage medium. In general, a binary bit having a value of one is encoded by changing the magnetic polarity between adjacent regions of the magnetic storage device 12, while a binary bit having a value of zero is encoded by not changing the polarity between adjacent regions. In effect, the write head 23 is a transducer that receives data that has been encoded in an electrical signal and converts it to data that is encoded in magnetic regions of a magnetic storage medium.

The read head 21 operates by detecting changes of the magnetic field that exists in proximity to the surface of the magnetic storage medium 12. In order to detect the changes, the read head 21 must be close to the surface of magnetic storage medium 12 at a distance that is defined as the fly height. Read heads typically use elements that operate using the GMR or TMR effects. A GMR read element, which is a small stripe formed from permalloy, is illustrated in FIG. 1d. The read head 21 is placed in close proximity to the rotating magnetic storage medium 12, which exposes the GMR element 35 to the magnetic fields associated with the bits written to the surface of the disk. The GMR element 35 operates by passing a current through the element. Changes in the magnetic fields associated with the bits written to the surface of the magnetic storage device 12 cause the voltage across the GMR element 35 to change. These voltage changes indicate the presence of the binary ones and zeroes, which enables the data written to the disk to be read.

FIG. 1d illustrates the GMR element 35 as being positioned between a pair of shields 37 and 39 that shield the GMR element from the magnetic effects of regions of the magnetic storage medium 12 that are adjacent to the region that is being detected. The shields 37 and 39 reduce the noise experienced in the read operation, and enable the real density of the storage medium to be increased. This recording head is described for purposes of illustration, and the recording heads of the invention can include read and write heads of any of a variety of designs, including conventional read and write heads that will be understood by those of skill in the art.

1. Recording Head with Integrated Micropositioner
   A. Micropositioner with Cavity and Flexure Posts FIG. 2 is an exploded perspective view of a portion of a recording head constructed according to one embodiment of the invention. Recording head 30 includes a slider body 32 having a trailing surface 34 as shown in FIG. 2. Slider body 32 is formed, for example, from alumina, alumina/TIC, another ceramic material, silicon, or silicon plus additional embedded circuitry. The slider body 32 has an air bearing surface 36, which, as shown in FIG. 2, is positioned opposite a top surface 38. The air bearing surface 36 defines an air bearing plane and maintains an appropriate fly height by the generation of an air bearing or air cushion between the air bearing surface and the adjacent surface of the magnetic storage medium. Details of the air bearing surfaces that can be formed according to embodiments of the invention are described herein below.

At or near the trailing surface 34, slider body 32 has integrated therein a micropositioner 40 that controls the position and motion of corresponding transducer body 42. Micropositioner 40 and the other micropositioners disclosed herein are implemented using microelectromechanical systems (MEMS) that use magnetic forces to close a gap between two components that move with respect to each other. As shown in FIG. 2, the micropositioner 40 includes a pair of toroidal coils 44 that are positioned at opposite ends of a cavity 46 formed in trailing surface 34. As will be explained in greater detail below, toroidal coils 44 can be used to induce a magnetic flux that causes transducer body 42 to be moved or positioned as desired in either the x or z directions. Methods for forming slider body 32 and the incorporated micropositioner 40 will be described in greater detail below.

FIG. 2 also illustrates transducer body 42, which is a discrete component that is movably connected to slider body 32 in order to permit motion of transducer in the transducer body in the z and x directions. Transducer body 42 is formed, for example, from silicon, alumina, alumina/TIC, or other ceramic materials. The transducer in transducer body 42 can be similar to transducers used in conventional recording heads that have been adapted dimensionally to fit within the transducer body 42. For example, the transducer elements illustrated in FIG. 1d can be adapted for use with transducer body 42.

In this embodiment, transducer body 42 is eutectically or otherwise bonded to a plurality of flexible posts or flexure members 48 positioned in cavity 46. It is noted that, in the embodiment of FIG. 2, flexible posts 48 have longitudinal axes that are aligned in the y direction, or the direction perpendicular to the trailing surface 34. When connected to flexible posts 48, transducer body 42 can move in the z or x directions under the control of coils 44 as flexible posts 48 deflect under the forces generated by the coils.

As shown in FIG. 2, trailing surface 34 of slider body 32 has a set of actuation bond pads 50 that are electrically connected with circuitry in the disk drive to control operation of the coils 44 as needed to move transducer body. Likewise, transducer body 42 has a trailing surface 52 with bond pads 54 that are connected with electrical circuitry of the disk drive to control operation of the read and write elements of the transducer. The transducer body 42 has regions formed from either a hard or a soft magnetic material, which cause transducer body 42 to react to the magnetic flux generated by coils 44.

FIG. 3a is a side view of the recording head 30 of FIG. 2, showing trailing surface 34 and illustrating the details of the micropositioner. FIG. 3b is a bottom view of the same recording head, and illustrates the air bearing surface 36. As shown in FIGS. 3a and 3b, some of the components of the slider body 32 and the transducer body 42 are offset from the center of adjacent components in order to permit the two toroidal coils 44 to selectively move the transducer of transducer body 42 independently in the x and z directions. While specific dimensions are disclosed in reference to the embodiment of FIGS. 3a and 3b, it is to be understood that these dimensions are not limiting and are presented only by way of example. Indeed, those of skill in the art, upon learning of the details of the invention disclosed herein, will recognize that any of a variety of dimensions can be used with the slider bodies and transducer bodies of the invention, and that the dimensions are often determined by the requirements of specific disk drives and magnetic recording media with which the invention is used.

As shown in FIGS. 3a and 3b, transducer body 42 is connected with slider body 32 by a set of four flexible posts 48. In this example, the flexible posts 48 are symmetrically spaced in the four quadrants of the transducer body 42 so as to define an axis of rotation of the transducer body in the y direction, about which the transducer body would rotate if equal and symmetrical forces were to be applied to the transducer body by coils 44.

In this example, transducer body 42 has a width of about 400 microns in the x direction, a height of about 200 microns in the z direction, and a depth of about 100 microns in the y direction. The coils 44 are offset from the axis of rotation 58 of transducer body 42, meaning that forces generated by the magnetic flux induced by coils 44 have a direction that does not pass through the center of transducer body 42. As a result, the magnetic forces generated by coils 44 produce a moment on the transducer body and tend to induce torsion or rotation of the transducer body and the associated flexible posts 48. Because the two coils 44 are offset from the center of transducer body 42 and generate two non-collinear forces on the transducer body, the two coils can be controlled together to move a selected point on the transducer body independently in either the z or the x direction.

In order to achieve control of the transducer body 42, the selected point that is moved in either of these two directions is defined to be an active region of the transducer that reads data from and writes data to the magnetic storage medium. As shown in FIG. 3b, the transducer is also offset in the x direction from the center of transducer body 42. This transducer offset facilitates the ability to move the active portion of the transducer independently in the z and the x directions by controlling the two offset coils 44. In this example, the transducer offset is about 20 microns in the x direction and the coil offset of the coils 44 is about 40 microns in the z direction.

In this example, there is a clearance of about 2 microns between the trailing surface 34 of slider body 32 and the adjacent surface 60 of transducer body 42. This clearance prevents transducer body 42 and slider body 32 from mechanically interfering with one another as flexible posts 48 deflect response to forces generated by coils 44. In this example, posts 48 have a thickness of about 10 microns, and the depth of the cavity 46 with respect to surface 60 of transducer body 42 is about 150 microns. Each coil 44 has, for example, forty turns. The thickness in the-z direction of slider body 32 is about 300 microns. As shown in FIGS. 3a and 3b, magnetic regions 56 of transducer body 42 are placed in proximity to the coils 44 to allow transducer body to respond to the magnetic flux generated by the coils 44. It is also noted that the magnetic regions 56 of transducer body 42 are offset in the y direction from coils 44, meaning that the forces generated by the interaction between these elements has a component in the y direction in addition to a component in the x direction. In general, however, the component in the x direction can be disregarded in this embodiment of the invention, because the flexible posts 48 substantially prevent motion of transducer body in the y direction.

B. Micropositioner with Electrically Conductive Flexures

Figure 4A:
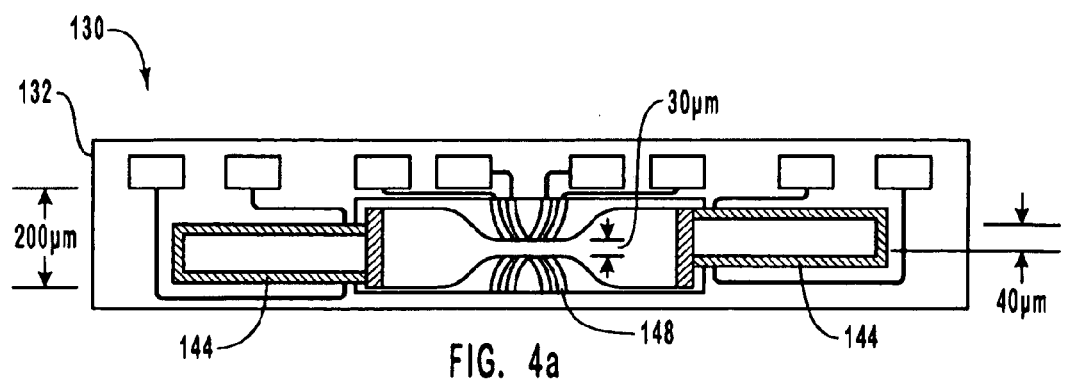
FIG. 4a is a side view of a slider body constructed according to another embodiment of the invention.

FIG. 4a illustrates a recording head 130 constructed according to another embodiment of the invention. One significant difference between the recording head 130 of FIGS. 4a and 4b and the recording head 30 of the previous embodiment is that the recording head 130 has flexures 148 that are aligned generally in the x-z plane. Advantages of the embodiment of FIG. 4a include no deep etch being required to form flexible posts and the increased surface area for attaching the transducer body 142 to the flexures 148. Another significant advantage is the elimination of external interconnect, such as bond pads, on the surface of the transducer body 142, as described below in reference to FIGS. 8 and 9.

Figure 4B:
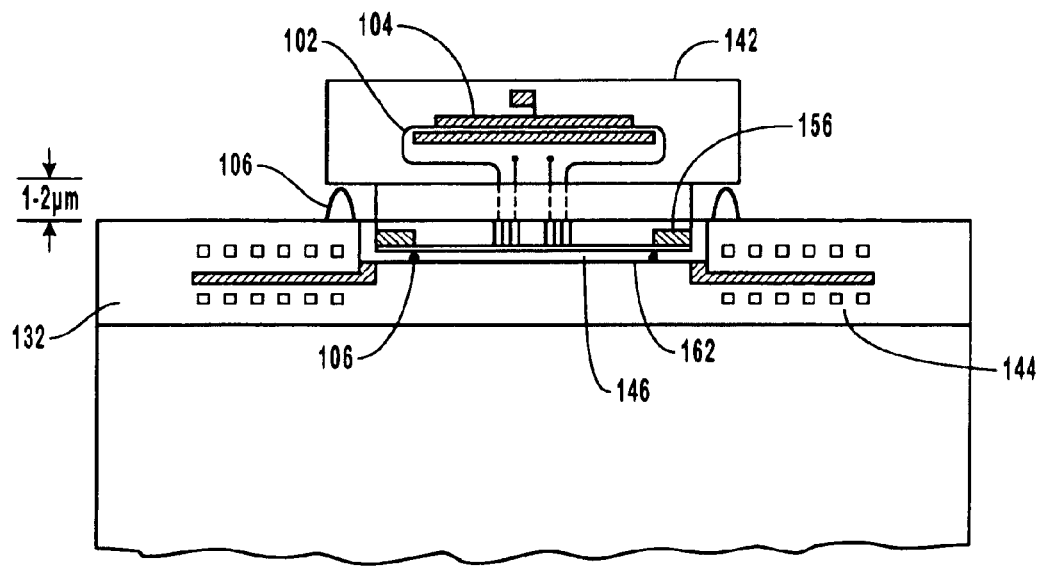
FIG. 4b is a bottom view of an assembly that includes the slider body of FIG. 4a connected with a corresponding transducer body having a metallized interconnect.

In this embodiment, coils 144 generate a magnetic flux that induces a force on magnetic regions 156 of transducer body 142 that is formed from either a hard or a soft magnetic material. In this embodiment, flexures 148 provide flexible mechanical support for transducer body 142. In addition, flexures 148 provide electrical communication between the transducer of transducer body 142 and slider body 132. As shown in FIG. 4b, internal leads 102 provide electrical communication between flexures 148 and transducer 104. The internal leads 102 extend through a metallized interconnect structure. Because the flexures 148 are aligned in the x-z plane, the flexures do not significantly prevent rotation of the transducer body 142 about the z axis or motion of the transducer body 142 in the x direction. In order to compensate, the recording head 130 has a set of spacers 106 in the form, for example, of carbon pads that substantially prevent rotation or motion of transducer body 142 out of the x-z plane. Spacers 106 are positioned between trailing surface 134 of slider body 132 and the adjacent surface 160 of transducer body 142. In addition, spacers 106 are also positioned in cavity 146 in proximity to surface 162 of transducer body 142.

In general, coils 144 and transducer 140 can be offset in the X and Z direction from the center of the transducer body 142 in a manner somewhat to that described above in reference to the offset of the corresponding components in the recording head of FIGS. 3a and 3b.

Figure 5A:
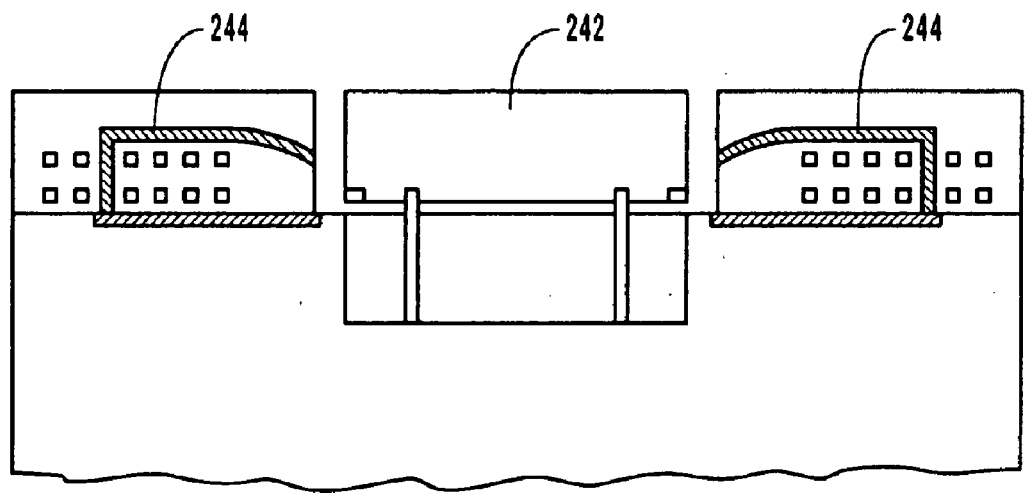
FIG. 5a is a bottom view of an assembly that includes a slider body and a transducer body according to another embodiment of the invention.
Figure 5B:
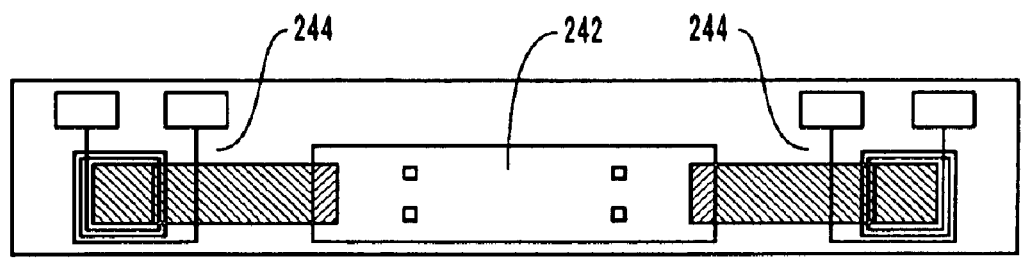
FIG. 5b is a side view of an implementation of the assembly of FIG. 5a that has aligned magnetic actuators that permit only translation of the transducer in one direction.
Figure 5C:
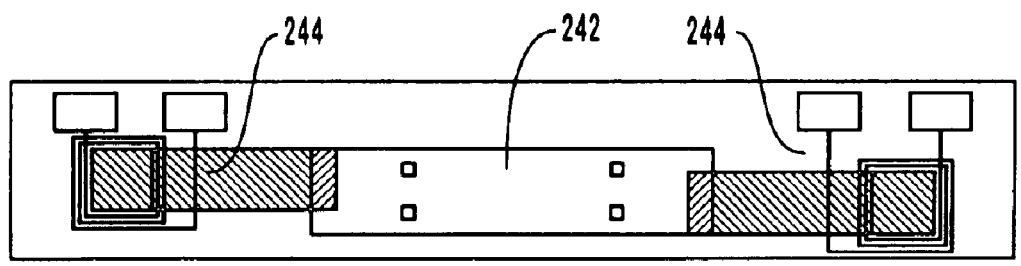
FIG. 5c is a side view of an implementation of the assembly of FIG. 5a that has offset magnetic actuators that permit translation and rotation of the transducer body and, accordingly, permit movement of the transducer element in two directions.

FIG. 5a illustrates a recording head constructed according to yet another embodiment of the invention. In this embodiment, coils 244 are oriented in the x-y plane instead of in the x-z plane, as was the case in the embodiment of FIG. 2. As shown in FIG. 5b, the coils 244 can be aligned with the center of transducer body 242, in which case, only translation of the transducer body 242 in the x direction is possible. In contrast, in FIG. 5c, the coils 244 are offset from the center of transducer body 242, which enables selected portions of the transducer body 242, such as the active portions of the transducer, to move independently in the x and z directions. In addition, the use of permanent, or hard, magnetic regions 256 on transducer body 242 enable coils 244 to generate either attractive or repulsive forces on the transducer body. In contrast, the use of soft magnetic materials in magnetic regions 256 permits coils 244 to generate only attractive forces. In addition, the coils 244 can be aligned so that the magnetic forces are generated in the y direction rather than in the x direction according to a different embodiment of the invention.

C. Micropositioner with Silicon Interlayer

Figure 6A:
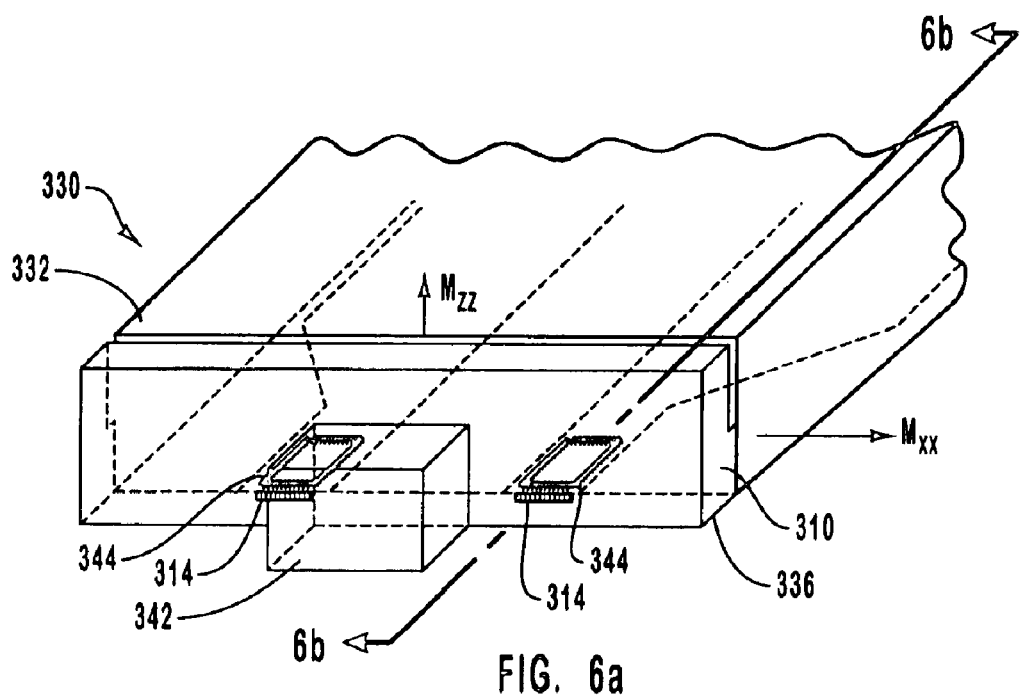
FIG. 6a is a perspective view of an assembly that includes a slider body, a transducer body, and a silicon interlayer according to one embodiment of the invention.

FIG. 6a illustrates another embodiment of the recording heads of the invention that uses a silicon interlayer as the flexure member that flexes and generates the motion of the transducer body. As shown in FIG. 6a, recording head 330 includes a slider body 332 with a pair of toroidal coils 344 positioned on or near the air bearing surface 336 of the slider body. Transducer body 342 is connected with slider body 332 using an interlayer 310 formed, for example, from silicon.

Figure 6B:
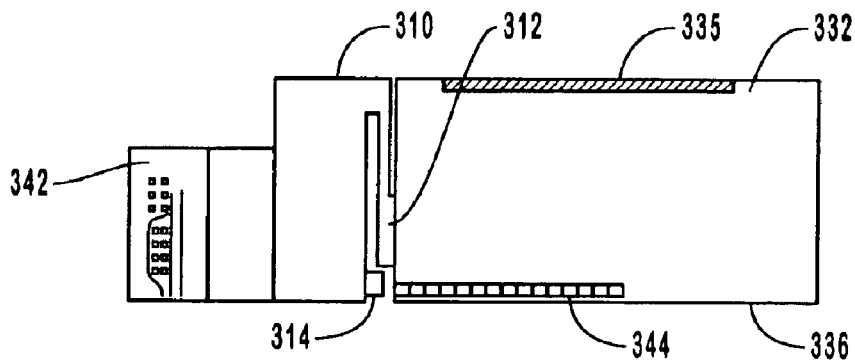

As shown in the side view of FIG. 6b, interlayer 310 includes a flexure 312 that is attached to slider body 332. Layer 310 includes a closure bar 314 formed from a soft or hard magnetic material positioned proximal to the coils 344 formed on slider body 332. Activation of both coils 344 attracts closure bar 314, imparting rotational motion $M_{xx}$, which effectively moves transducer body 342 in the z direction toward the magnetic storage medium. Activation of only one of the coils 344 or imbalanced activation of the coils also induces rotational motion $M_{zz}$ of the transducer body 342, which effectively causes the transducer to move in the x direction. In this way, the coils 344 can selectively activated to produce motion of the transducer in the z or the x directions.

Figure 6C:
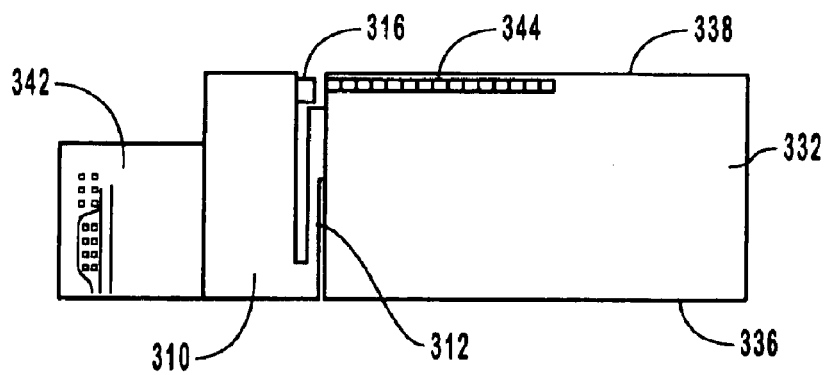
FIG. 6c is a side view of a variation of the assembly of FIG. 6a that uses a hard magnetic material to enable motion of the transducer.

FIG. 6c illustrates a variation on the embodiment of FIG. 6b, in which interlayer 310 z is inverted. In this embodiment, coils 344 are positioned at or near top surface 338 of slider body 332 opposite air bearing surface 336. In order to adjust the fly height by moving transducer body 342 closer to the surface of the magnetic storage medium, coils 344 are used to generate a repulsive force on magnetic pole piece 316, which is formed from a hard magnetic material. A repulsive force on magnetic pole piece 316 causes flexure 312 to bend and to cause rotation $M_{zz}$ of transducer body 342, which has the effect of moving transducer body 342 in the z direction. Selectively adjusting the forces generated by each of the two coils 344 can also generate motion of transducer body 342 in the x direction.

Figure 7A:
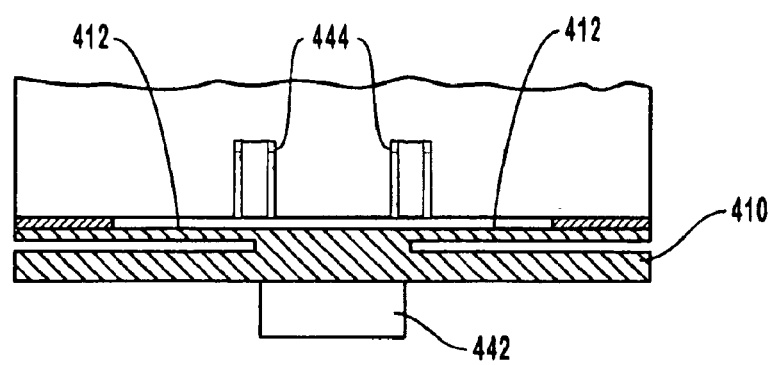
FIG. 7a is a top view of an assembly that includes a slider body, a transducer body, and a silicon interlayer according to one embodiment of the invention.
Figure 7B:
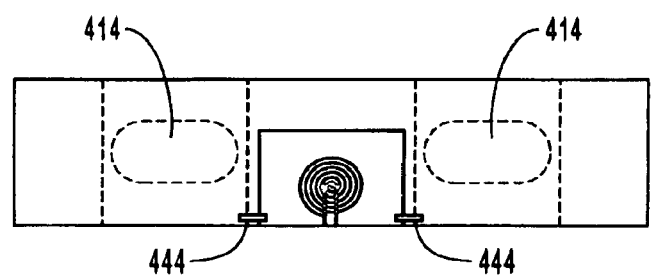

FIG. 7a is a top view of a recording head assembly that uses an interlayer 410 having flexures 412 that are adapted to generate bending motion that is offset by 90° compared to the bending motion of the flexures 312 of FIG. 6b. In this embodiment, flexures 412 have, as needed, an etched region 414 in which the thickness is reduced or in which a hole is etched therethrough to reduce the stiffness of the flexures. As in other embodiments, the voltages applied to coils 444 can be selected so as to cause independent motion of transducer body 442 in either the z or x directions.

The slider bodies for use with the silicon interlayers, such as those illustrated in FIGS. 6a–6c, 7a and 7b, can contain other electronic circuitry constructed prior to the attachment of the silicon flexures. The circuitry embedded in the slider bodies can include, for example, amplifiers, signal conditioning ICs, and other circuitry for modifying or otherwise conditioning the read write signals. As used herein, the term "conditioning" used in the context of this circuitry refers to amplification, modification, or any other processing of the read and write signals. Embedding such circuitry can reduce the cost of head gimble assemblies and disk drives, by reducing fabrication costs. The embedded circuitry can also have the purpose of protecting the recording head from electrostatic discharge (ESD) damage during and after head processing. Protection against ESD damage in this manner is quite useful, as finished recording heads are sensitive to less than 5V, making them one of the most sensitive devices currently in production. The embedded circuitry can be formed, for example, near the top surface that is opposite the air bearing surface 336 and parallel to the surface of the recording medium. FIG. 6b illustrates an example of the positioning of the embedded circuitry at, for example, region 335 near top surface 338 of the slider body.

2. Electrical Interconnect Structures

Figure 8:
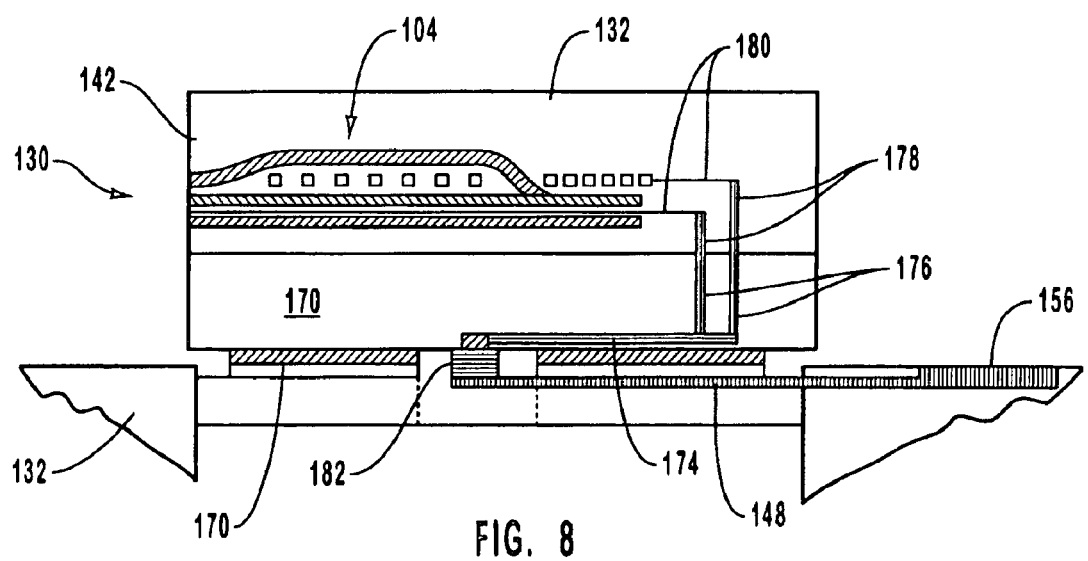

FIG. 8 is a cross-sectional side view of one embodiment of the flexures for electrically interconnecting transducer 104 and circuitry on slider body 132 in recording head 130. It is noted that the recording head 130 and slider body 132 of FIG. 8 are also illustrated in FIGS. 4a and 4b. As shown in FIG. 8, transducer body 142 is bonded to a substrate 170. The substrate 170 is connected to flexures 148 using a mechanical bonding layer, such as an epoxy, a solder, or the like, as shown at 172.

In general, the transducer heads of the invention are connected to electrical circuitry on the slider bodies and, in turn with circuitry in the disk drive using flexible electrical leads that contribute negligible residual forces on the transducer bodies so as to permit transducer bodies to freely move with respect to the slider bodies. In the embodiment of FIG. 8, and as described above in reference to FIGS. 4a and 4b, the electrical interconnects can be formed on the flexures that are in contact with the transducer bodies. The electrical leads on the flexures 148 can be formed by metallization and etching procedures. The substrate has a set of internal or recessed leads 174 that lead to conductive vias 176 formed through the substrate 170. The conductive vias 176 in turn are connected with built-up leads 178 formed in the transducer body that are connected with writer/reader leads 180 that control the operation of transducer 104.

The substrate 170 with its conductive vias 176 is formed separately from and then bonded with transducer body 142 with its built-up leads 178 according to this embodiment of the invention to facilitate the fabrication process. As shown in FIG. 8, the conductive leads associated with flexures 148 are connected to bond pads associated with recessed leads 174 using an electrical solder interconnect 182. In addition, bond pads 156 are formed on trailing surface 134 of slider body 132 to permit the circuitry shown in FIG. 8 to be connected with leads associated with the head gimble assembly on which recording head 130 is positioned.

Figure 9:
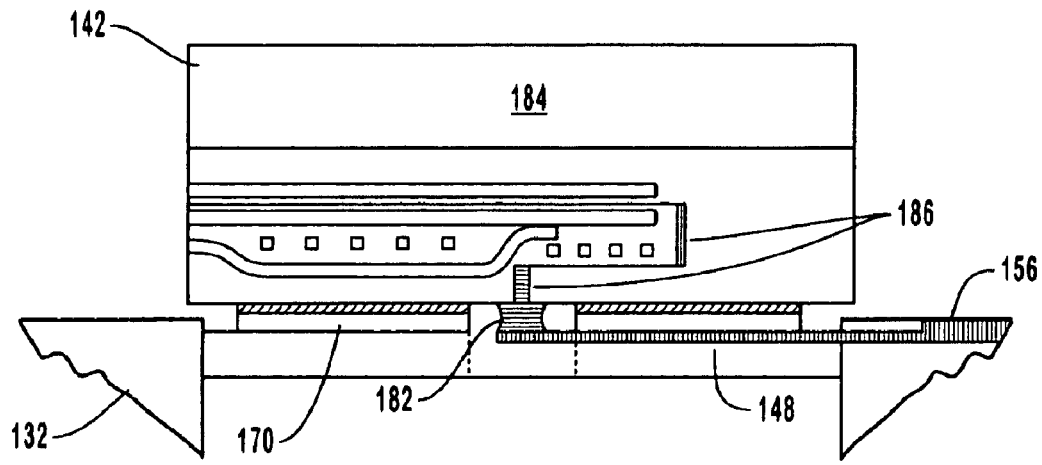

FIG. 9 illustrates a separate embodiment of the techniques for electrically interconnecting transducer 104 with circuitry on slider body 102 and elsewhere in the disk drive. In this embodiment, a flip-chip interconnection technique is used, whereby transducer body 142 is inverted with substrate 184 being positioned opposite from the flexures 148. In this embodiment, the built up vias 186 and transducer body 142 are connected directly with the conductive leads on flexures 148 using an electrical solder interconnect 182. In general, either of the two basic techniques for electrically interconnecting transducer 104 with external circuitry as shown in FIG. 8 and 9 can suitably enable the transducer to be controlled in combination with the micropositioning methods of the invention.

3. Air Bearing Surfaces

Figure 10:
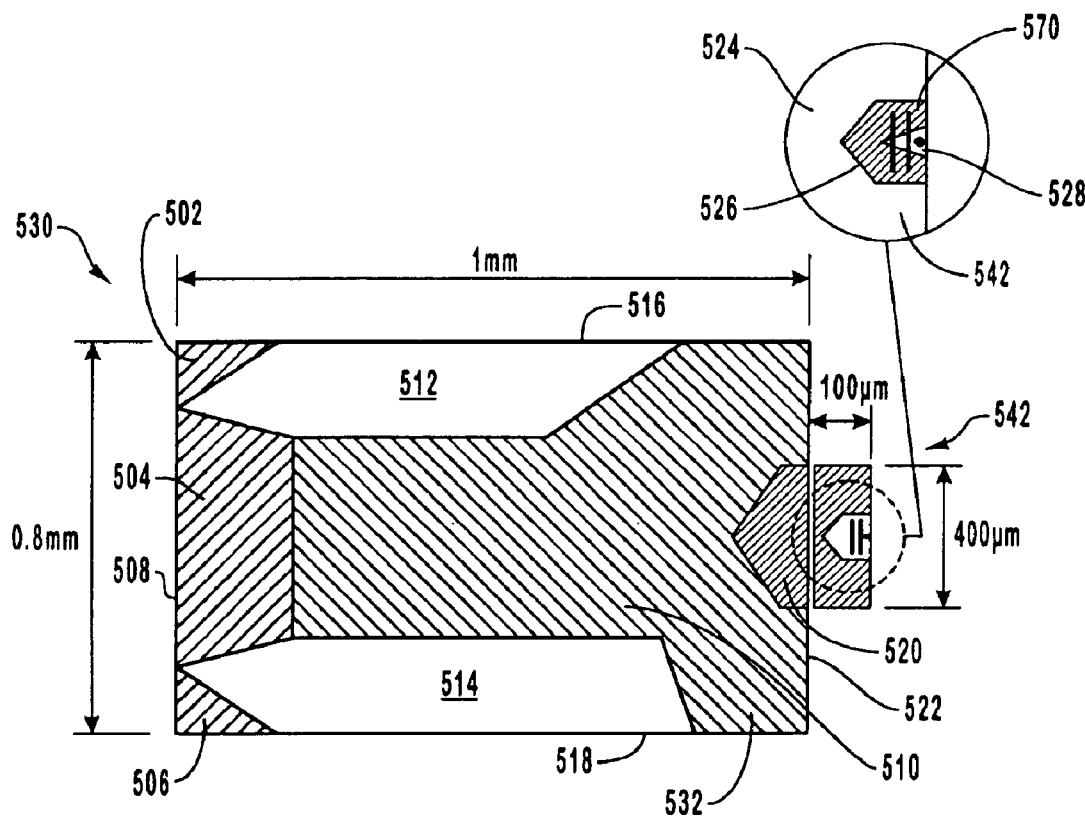
FIG. 10 is a view of the air bearing surface of the slider body and the transducer body of the assemblies of the invention.

FIG. 10 is a bottom view of a recording head with a pattern of etching that results in the formation of an air bearing surface that enhances the ability to control the fly height during operation. In FIG. 10, the crosshatched area represents regions of the bottom surface of recording head 530 that is etched during fabrication process. Surfaces 502, 504 and 506 on leading edge 508 of slider body 532 are processed with a shallow etch to form a taper region that controls inlet conditions to the air bearing of FIG. 10. Surfaces 502, 504 and 506 are illustrated as being step tapers that coplanar with the surface of the magnetic storage medium. Alternately, the taper surfaces can be mechanical tapers that are angled with respect to the magnetic storage medium. The bottom surface of slider body 532 also includes an etched surface 510 that, together with surfaces 502, 504 and 506, define two air bearing surfaces 512 and 514 along lateral edges 516 and 518 of slider body 532.

Bottom surface of slider body 532 also has a trailing shallow etched surface 520 near the trailing edge 522. In this embodiment, the tapered etched surfaces 502, 504 and 506 are etched to a depth that ranges from about 0.5 microns at leading edge 508 to about 0.1 micron at the junction with etched surface 510. Etched surface 510 is etched to a depth of about 1 micron to about 4 microns. The reference plane from which these nominal depths are measured is that of air bearing surfaces 512 and 514. During operation, the combination of the surfaces described above channels air between air bearing surfaces 512 and 514 and generates an air bearing cushion between air bearing surfaces 512 and 514 and the adjacent portion of the surface of the magnetic storage medium.

As shown in the inset in FIG. 10, the bottom surface of transducer body 542 is etched or otherwise contoured to define an air bearing surface on the transducer body. Although the depth to which the various portions of surface of transducer body 542 is etched varies, it is useful to conceptualize its portions as being divided into three categories. First, the first portion 524 is etched to a depth comparable to that of shallow etched surface 520 of slider body 532. Next, the second portion 526 of the bottom surface of transducer body 542 is etched to a more shallow depth than first portion 542. Finally, the third portion 528 of the bottom surface of transducer body 542 is not etched, and represents an air bearing surface on the transducer body. The third portion 528, which represents the air bearing surface, is positioned around the transducer element 570 so that the transducer element can remain closer to the surface of the magnetic storage medium than other portions of the bottom surface of transducer body 542 as transducer body rotates in response to forces generated by the coils associated with the micropositioners in recording head 530.

The pattern constructed according to the principles set forth in relation to FIG. 10 enhances the control of the motion of the transducer in the z direction. For example, at fly heights of about 25 nm, causing the transducer body 542 to move with respect to slider body 532 by an amount of 1 nm results in the fly height being reduced by only about one angstrom. In other words, in this example, the effective change in the fly height is only about $\frac{1}{10}$ of the relative motion experienced between transducer body 542 and slider body 532. Thus, very fine changes in the fly height can be achieved with more rough changes in the relative position of the transducer body 542 with respect to the slider body 532, and the resolution of the device is effectively by magnified up to a factor of 10, depending on the nature of the air bearing surfaces and the fly heights.

4. Fabrication Processes

A. Micropositioner with Cavity and Flexure Posts

Figure 11A:
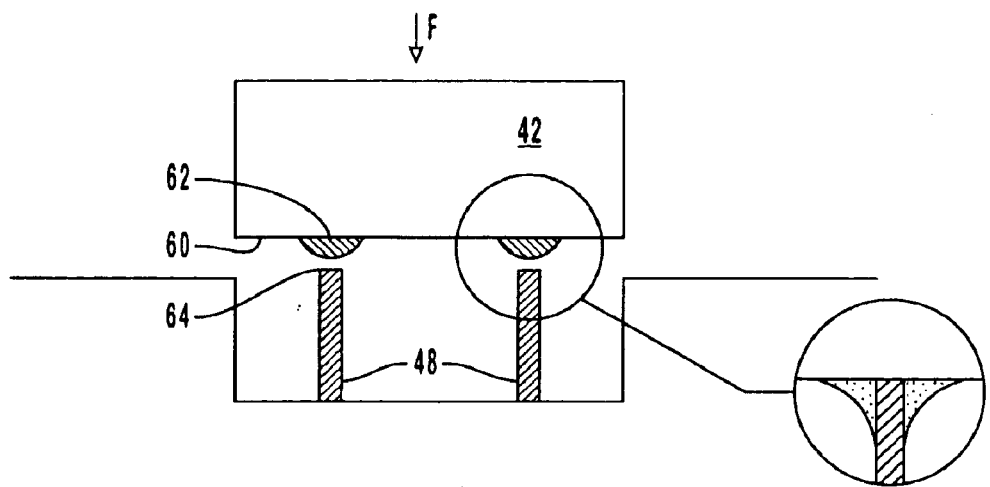
FIG. 11a–11c illustrate alternate techniques of bonding the transducer body to the posts of the slider body to form the assemblies of FIG. 2.
Figure 11B:
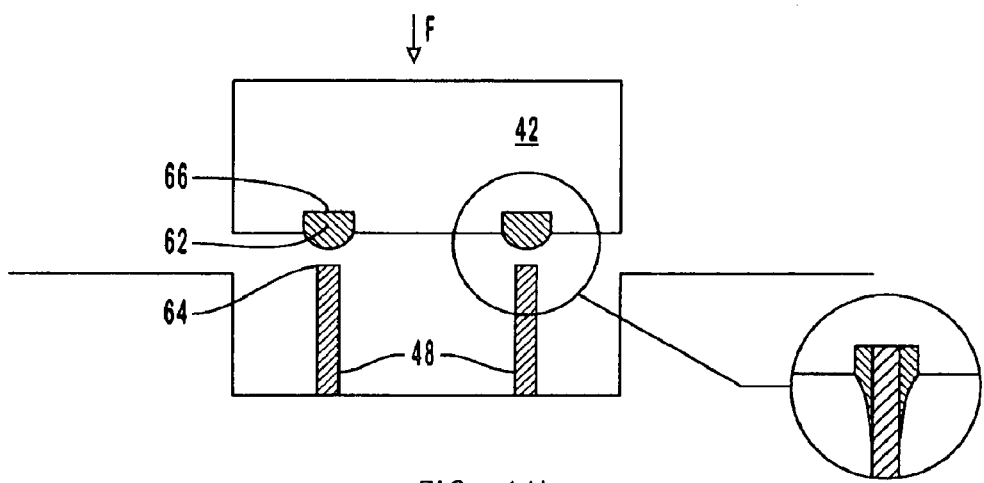
Figure 11C:
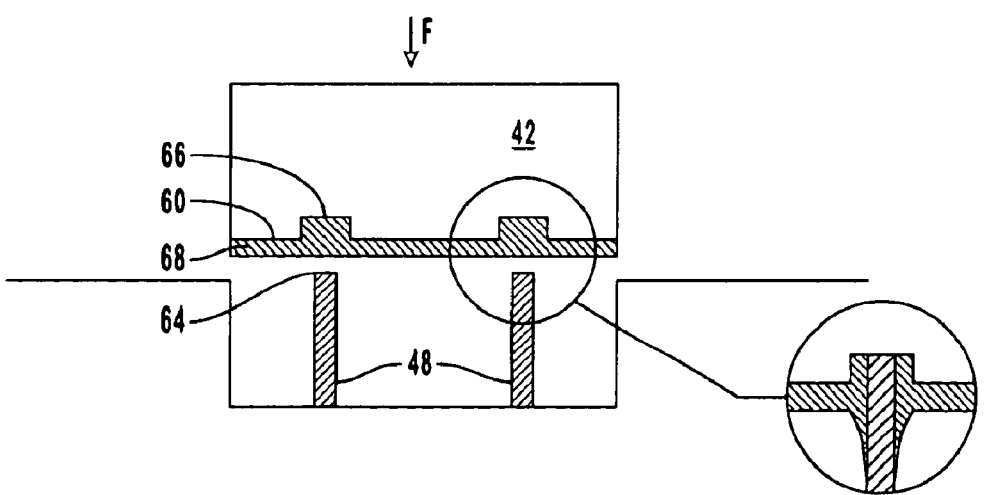

FIGS. 11a–c illustrate alternate techniques for bonding the transducer body 42 of FIG. 2 to the flexible posts 48. Given the small contact area at the trailing edge of the transducer body and the open cavity construction of the device, several preventative steps may be required to ensure adequate robustness of the mechanical connection between the transducer body and the slider body, examples of which are illustrated in FIGS. 11a–c. As shown in FIG. 11a, the transducer body 42a is aligned with flexible post 48, with epoxy, low temperature solder (e.g., PbSn or AuSn) or another bonding material arrayed on surface 60. The bonding material 62 is aligned with free ends 64 of flexible posts 48 and bonds therewith as transducer body 42 is brought into contact with flexible post 48.

In an alternate technique for bonding transducer body 42 to flexible post 48 illustrated in FIG. 11b, an array of notches 66 are formed in surface 60 of the transducer body 42. The notches are aligned with free ends 64 of flexible posts 48 and a bonding material, such as an epoxy or low temperature solder, is positioned in the notches. As shown in the inset in FIG. 11b, the bonding material adheres to flexible post 48 and effectively increases the diameter thereof, adding to the shear strength of flexible post 48.

As shown in FIG. 11c, another alternate technique for bonding transducer body 42 to flexible post 48 involves applying a layer of a bonding material such as epoxy or a low temperature solder over surface 60 of the transducer body. The layer 68 of the bonding material covers surface 60 as well as notches 66 formed in surface. When transducer body 42 is brought into contact with free ends 64 of flexible posts 48, the bonding material adheres to the flexible posts, thereby forming a bond between the transducer body and the flexible posts. In addition, a full epoxy preform consisting of an elastically soft material can be used to fill in the cavity area around the posts 48. Moreover, in any of the foregoing cases, the flexible post 48, near the free ends 64 thereof, can be metallized or otherwise treated to enhance the wetting of the posts 48 by the bonding material. In this way, the bonding material, while it is in a liquid state, can easily wet the surface of the metallized or treated posts 48, which facilitates the contact with the bonding material and the adhesion therewith.

Figure 12:
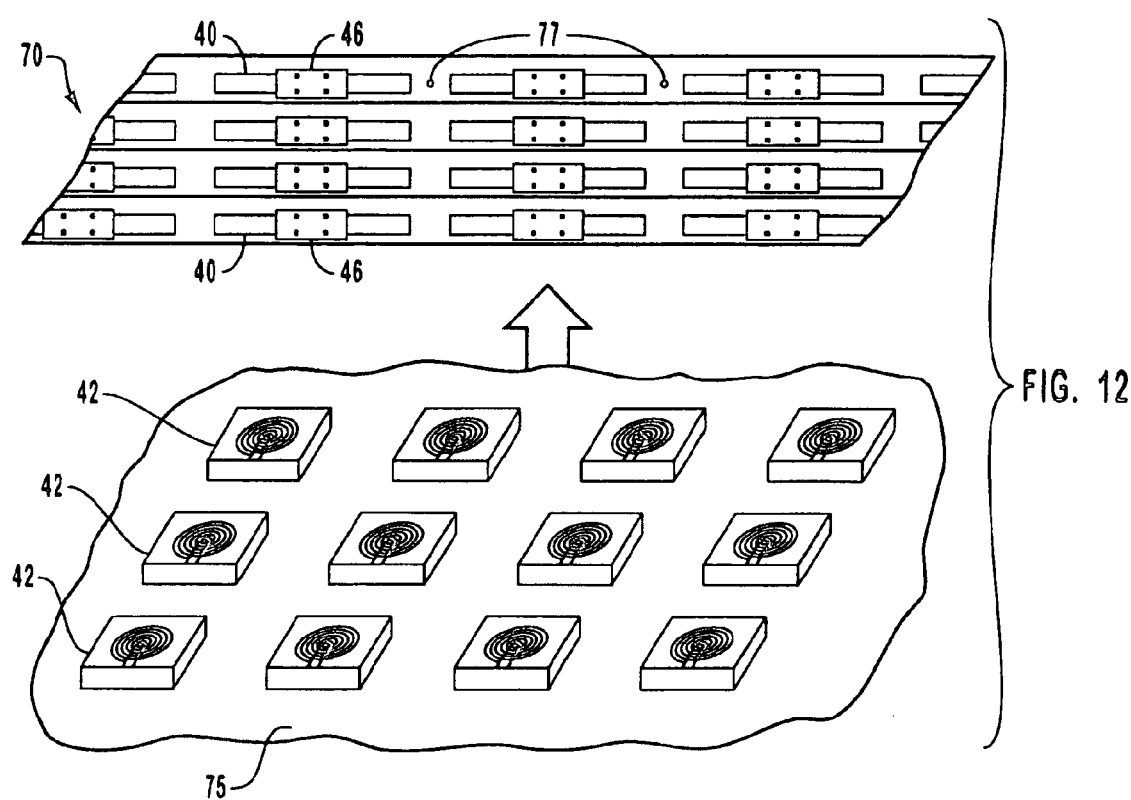
FIG. 12 illustrates an array of slider bodies and transducer bodies at a stage in the fabrication process according to one embodiment of the fabrication methods of the invention.

The transducers and slider bodies of the invention lend themselves to semiconductor chip fabrication processes that can be advantageously used to mass produce the recording heads of the invention. Although specific methods for fabricating the recording heads of the invention are disclosed herein, the invention also extends to other fabrication processes based on the general principles disclosed herein. FIG. 12 illustrates an intermediate stage in the fabrication process by which an array of transducer bodies are aligned with and positioned on an array of slider bodies. In general, slider bodies and transducer bodies of the invention can be formed using processes adapted from the semiconductor industry, by which the components of the devices are formed on a wafer or a substrate. The slider body 32 of FIG. 2 can be formed, for example, by processing the exposed face of a wafer which, when wafer is diced, will form the trailing surfaces 34 of the resulting slider bodies. The toroidal coils 44 and the bond pads on the trailing surface 34 can be formed by a metallization and etching process, combined with a process for building up a micopositioner coils 44. Likewise, cavity 46 and the flexure posts 48 contained therein can be formed using an etching process to remove material from trailing surface 34 of slider body 32. Those skilled in the art, upon learning of the details of the invention disclosed herein, will recognize that these components positioned on the trailing surface 34 of slider body 32 can be formed using semiconductor fabrication processes that can be adapted for use with the invention.

FIG. 12 illustrates a wafer 70 having formed thereon an array of micropositioners 40 and cavities 46 that will later be formed into components of the slider bodies. One advantage of the recording heads that the fabrication process integration methods of the invention is that the density of the chips increases dramatically, or roughly four times, compared to processes for conventional transducers. Because the largest component of cost of a transducer wafer relates to capital and processing times, a four-fold improvement in density roughly equates to a four times reduction in cost. The transducer bodies 42 of FIG. 12 can also be formed using lithography techniques to form the structures associated with the transducers. As shown in FIG. 12, an array of diced transducer bodies 42 are positioned on a stretch tape ring 75. A pick-place system can be used to attach the transducer bodies 42 to the corresponding slider structures of slider wafer 70 using, for example, the bonding techniques illustrated in FIGS. 11a–c.

According to one embodiment of the fabrication processes for forming the slider wafer 70, a first step involves using a mask to etch back an area surrounding the region that will receive the transducer body 42 by roughly 5 microns. This formation of a recess eliminates mechanical interference with the transducer body after it is attached. Next, a series of masks are used to form the coils 44 by building up metallized structures on the face of slider wafer 70. Next, a deep etching process is used to remove material to form cavity 46 and flexible posts 48. Next, process of metallizing flexible posts 48 using, for example, TiW or AuSn at a depth of 5 microns, and the metallization of the bond pads is performed. In addition, fudicial marks 77 are formed on face of slider wafer 70 to facilitate the alignment of the components on slider wafer 70 with the transducer bodies 42.

Individual transducer bodies 42 can be formed using a process that involves first forming an array of conventional transducers on a wafer. Next, the back surface of the wafer opposite the active portions of the transducers is ground to a thickness of about 100 microns. A mask is then used to form the magnetic regions 56 on the transducer wafer, which requires back side alignment and relatively loose tolerances. In addition, notches 66 or other structures for receiving free ends 64 of flexible posts 48 can be formed on the back surface of the transducer wafer.

In the next step, the areas on the back surface of the wafer are metallized using, for example, a TiW alloy or AuSn (80/20) at about 5 microns. The transducer components on the transducer wafer are optically aligned and a grind process is performed to achieve a 5 micron height of the stripe, which is the magnetic element of the read head. Bars, which include a linear array of transducer elements, are sliced from the transducer wafer. The bars are then placed on stretch tape, and the individual transducer bodies on the bars are diced. The individual transducer bodies 42 illustrated in FIG. 12 are then picked and placed onto the slider wafer and bonded in the ways disclosed herein. In general, the alignment of the transducer bodies as they are bonded onto slider wafer 70 generally should be within about 5 microns.

Figure 16:
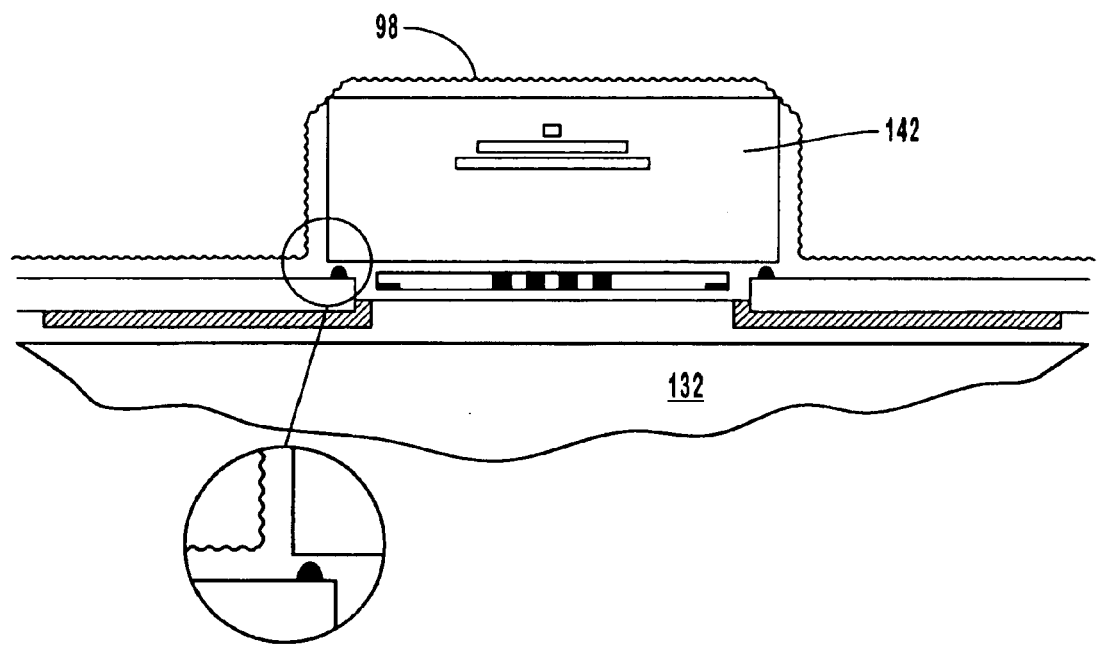
FIG. 16 is a side view of an intermediate stage in a fabrication process performed according to the invention in which a protective layer is formed over the assembly and then isotropically etched to permit motion of the transducer body.

FIG. 16 illustrates a process by which a protective layer is formed over the assembled transducer and slider element to prevent contamination in the spaces between the transducer body 142 and slider body 132. The protective layer 98 is applied during the process of adhering the transducer body to the flexible posts using, for example, the techniques illustrated in FIGS. 11a–11c. As shown in FIG. 16, a viscous non-reactive organic material is coated in a layer 98 over the assembly that includes the slider body 132 and the transducer body 142. Prior to dicing the slider wafer, an isotropic etching process, such as plasma ashing etch operation, is performed to remove the coating layer 98 and to free the transducer body 142 to move with respect to slider body 132.

With the transducer bodies bonded onto the slider wafer, the slider wafer is then sliced using a grinding process to obtain a linear array of assembled slider and transducer assemblies. The grinding process by which the wafer 70 of FIG. 12 is sliced achieves a dimension that generally within about 10 microns of finished dimension of the recording head. A process of partially dicing the slider bodies with scores about 2 mils deep is performed. Next, the transducer bodies are wire bonded to bond pads on the slider bodies.

Figure 13:
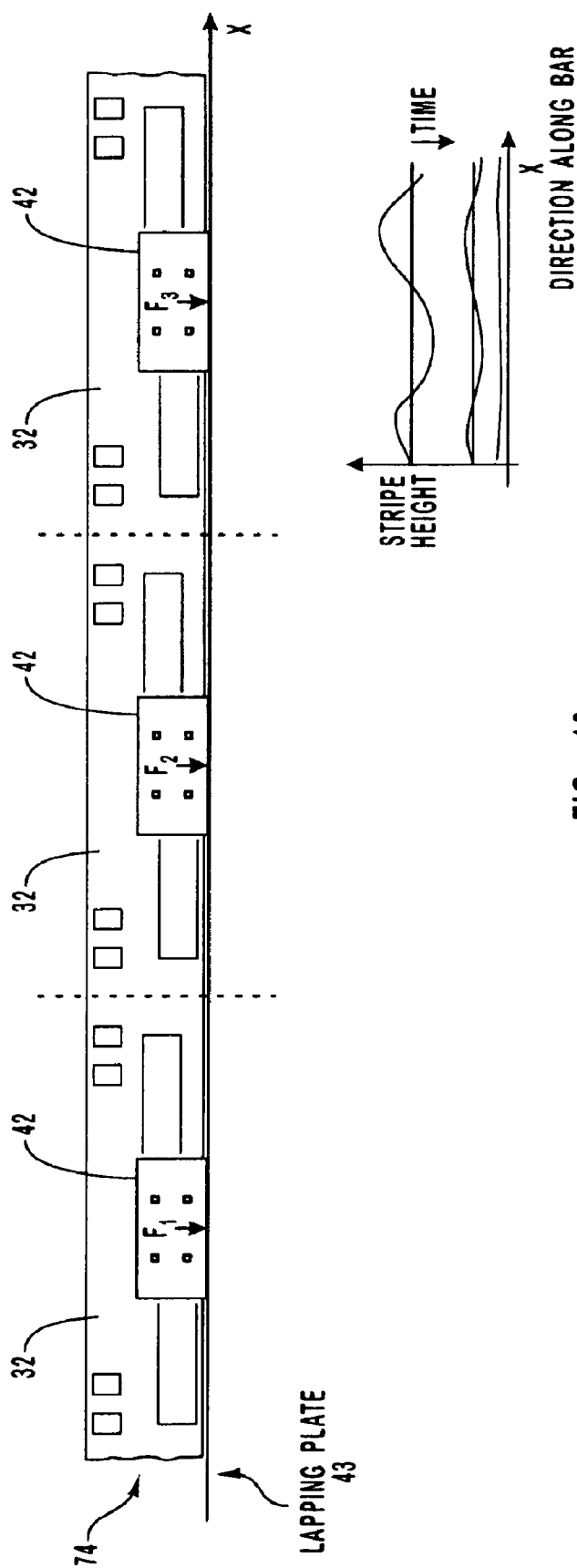
FIG. 13 illustrates a stage in the fabrication process in which a bar that includes a linear array of transducer and slider assemblies is lapped while the micropositioners are actuated to achieve the desired dimensional control.

FIG. 13 illustrates a bar 74 that includes a linear array of transducer and slider assemblies in preparation for a lapping process to achieve coplanar air bearing surfaces and thicknesses of the assemblies. As described below, the lapping process uses an internal control mechanism by which the z height is adjusted with feedback from the transducer element during lapping. This process reduces a large component of conventional manufacturing costs. In the lapping process of FIG. 13, the slider bodies 32 on the bar are positioned on the lapping plate 43. The micropositioners disclosed herein are then used to lower the transducer bodies 42 in the z direction and to press the bottom surface of the transducer bodies onto the lapping plate 43. As described above, the read heads included in the transducer bodies 42 include a stripe that is formed from a permalloy or another magnetic material and has a resistance that can be measured.

As the transducer body 42 is pressed onto the lapping plate 43, material from the bottom surface of the transducer body is removed. At the same time, part of the material of the stripe is also removed, thereby reducing the cross-sectional area thereof and increasing its resistance. The measured value of the resistance of the stripe in the transducer bodies 42 can be used to control the voltage applied to the micropositioners and, consequently, the force ($F_1$, $F_2$, $F_3$) applied to the transducer bodies and the corresponding pressure applied to the lapping plate 43. When it has been determined that the appropriate amount of material has been removed using the lapping plate 43, the lapping process is terminated by removing the voltage applied to the coils within the micropositioners. Because each recording head has an integrated micropositioner, each transducer body 42 in the array of assemblies in bar 74 can be actuated independently to control the depth of the lapping operation on the particular transducer body. By achieving equilibrium between the transducer bodies arrayed in the bar 74, this technique can be used to equalize the dimensions of each of the transducer bodies, including the stripes of the read heads, to within about 0.01 microns, which is illustrated conceptually in the graph that accompanies FIG. 13. This also eliminates the need for complex stripe height lapping hardware that has been used in the industry for forming transducers.

Figure 14A:
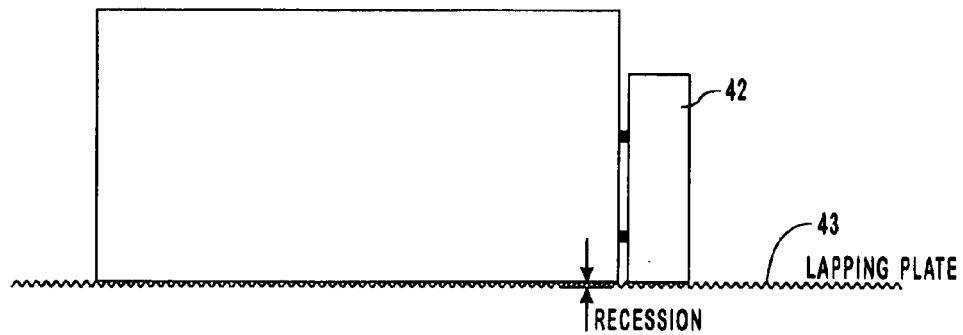
FIGS. 14a and 14b illustrate a lapping operation by which substantial coplanarity of the transducer body and the slider body is achieved.
Figure 14B:
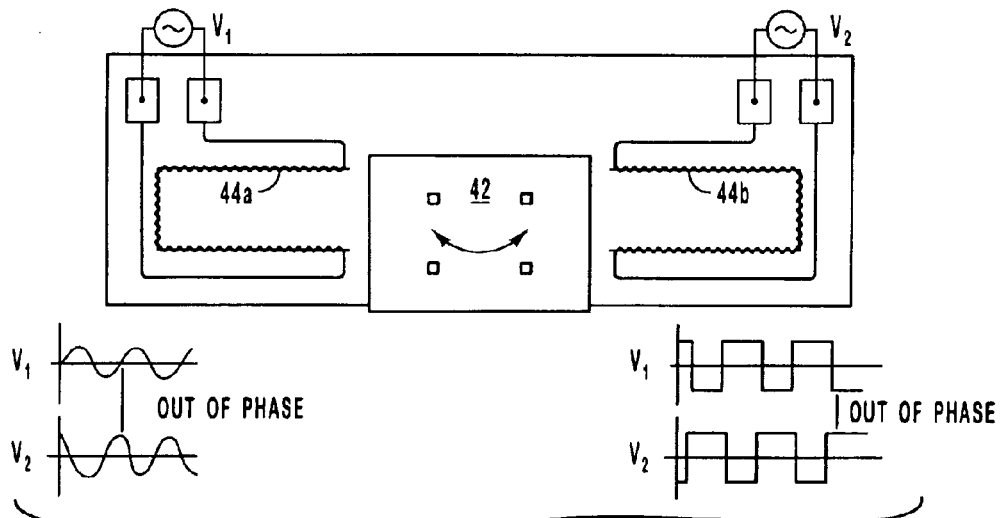
Figure 14C:
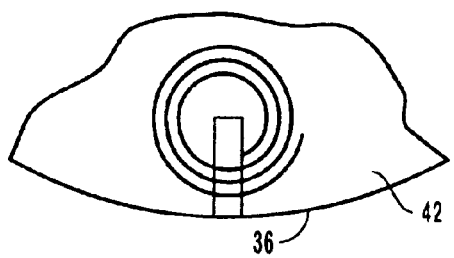
FIGS. 14c and 14d are a side view of a portion of the transducer body of FIGS. 14a and 14b, showing a crown or profile formed on the surface of the transducer so that the pole of the transducer is nearest the surface of the data storage medium.

In addition, as illustrated in FIGS. 14a–c, a related process can be used to form a crown or curvature on the bottom surface of the transducer body. The two voltages $V_1$ and $V_2$ applied to coils 44a and 44b are oscillated out of phase with one another, as illustrated in the graphs that accompany FIG. 14b, to achieve rotational motion of transducer body 42 as the transducer body is biased against lapping plate 43. This oscillation in transducer body 42 results in a contour lap of the bottom or air bearing surface 36 of the transducer body 42, which causes the active portion of the transducer to remain at the minimum point with respect to the surface of the magnetic storage medium during system operation.

Figure 14D:
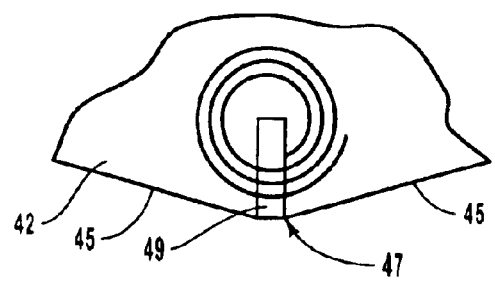

As shown in FIG. 14d, an alternate method of lapping involves forming a surface with the active portion of the transducer at the apex, rather than the rounded crown illustrated in FIG. 14c. In this method, the lapping of the surface of the transducer body 42 begins by using the micropositioner to rotate the transducer body to one extreme. This rotation causes lapping on the far edge of the transducer body chiplet, away from the active portion of the transducer. The By lapping continues until the region of removal reaches the transducer area, where a change in resistance of the stripe of the read element is observed. Once the resistance change begins, the actuator is pulled to the opposite rotation direction, and again, allowed to lap until a resistance change in the stripe of the read element is observed. Lapping then proceeds by continuing to rotate the transducer body chiplet from extreme to extreme position, each time waiting for a specific amount of transducer stock removal. This process forms a pointed, two-sided tip 45 with the active portion of transducer 49 at the apex 47, allowing the transducer to be maintained as the fly height, through all rotation angles in operation.

B. Micropositioner with Electrically Conductive Flexures

Figure 15A:
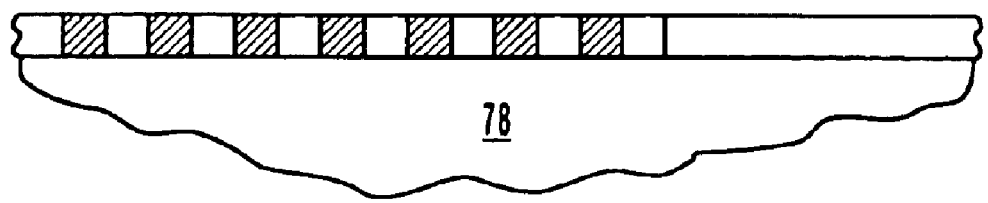
FIG. 15a–15e illustrate successive steps in a fabrication process conducted according to the invention, by which the assembly of FIG. 4a can be formed.
Figure 15B:
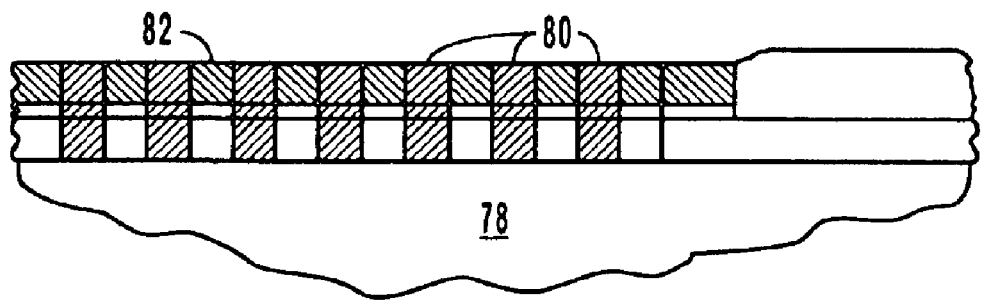

FIGS. 15a–e illustrate successive steps in a fabrication process that can be used to form the slider body 132 of the embodiment of FIG. 4a. In particular, FIGS. 15a–e illustrate techniques for building up metallized structures to form the coils 144 used in the micropositioners of the transducers of this embodiment, which fully embed the permalloy core and the coils into the slider body. In a first step, a conductive material, such as copper, is patterned onto the surface of the substrate 78. In addition, as illustrated in FIG. 15b, copper vias 80 are built up in connection with the copper structures formed in the step of FIG. 15a. A permalloy structure 82 is also formed on the substrate 78. The permalloy structure will constitute the core of the coils 144 that are formed according to these methods.

Figure 15C:
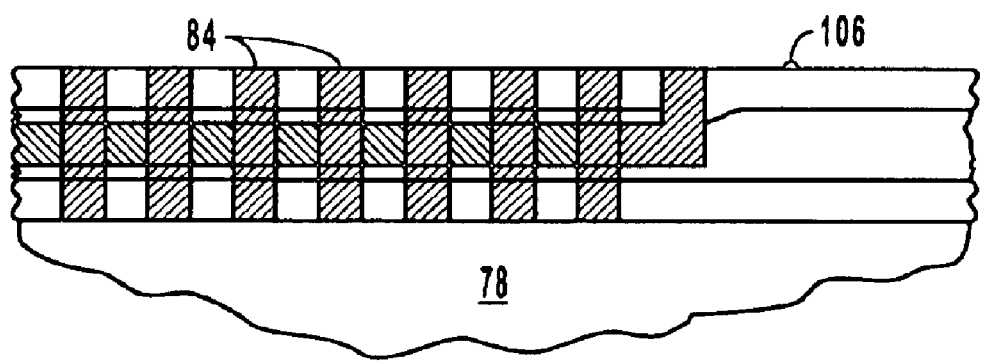
Figure 15D:
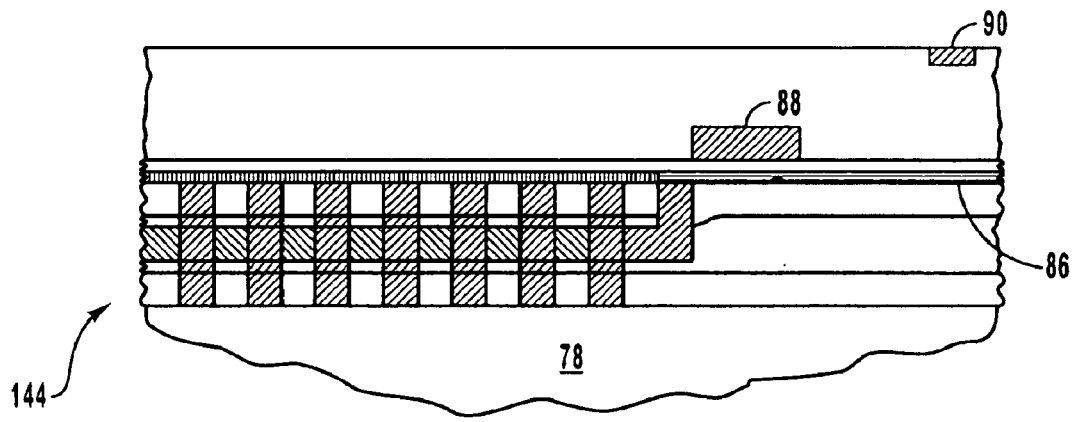
Figure 15E:
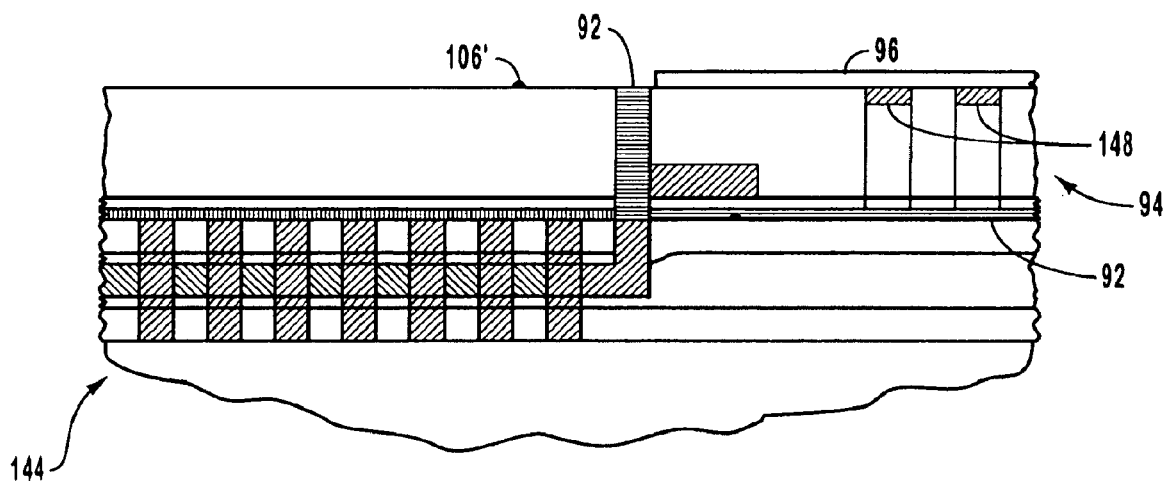

As shown in FIG. 15c, additional layers are formed to complete the coil structure, including the continued buildup of the copper vias 80 and an upper coil layer 84. In addition, as shown in FIG. 15c, carbon pads 106, which are spacers to constrain motion of the transducer body, are formed on the substrate 78. The carbon pads 106 are low-friction structures that prevent surface to surface contact between adjacent components, such as between the flexures and the remainder of the slider body, which could otherwise result in stiction. In FIG. 15d, additional layers are formed on the substrate 78, including an organic or inorganic etchant layer 86, a permalloy or other magnetic material in region 88, and a metallized region 90. As shown in FIG. 15e, a region 92 is then isotropically etched, which releases the layer 86 formed from the organic or inorganic material, consequently releasing the structures 94 associated with flexures 148 and freeing the motion thereof with respect to the remainder of the slider body 132. A layer 96 is also formed on structures 94 to later be used to attach to the transducer body. Finally, carbon pads 106′, which are spacers for constraining motion of the transducer body, are formed on the substrate 78, as shown in FIG. 15e.

C. Micropositioner with Silicon Interlayer

In the process of fabricating the recording heads of FIGS. 6a–c and 7a–b, the air bearing surface is formed on the face of the wafer, prior to dicing the wafer into individual recording heads. This is done by first patterning the air bearings onto the full wafer surface, together with the two toroidal coils 344 on either the air bearing surface 336 or the top surface 338 of the wafer. If the coils 344 are formed on the air bearing surface 336, according to the embodiment of FIG. 6b, the face of the wafer is replanarized after deposition to ensure that it is can perform as the air bearing. The coils 344 can also be formed on the surface 338 opposite the air bearing surface according the embodiment of FIG. 6c. As noted above, embedded circuitry for amplifying, conditioning, or otherwise modifying the read-write signals or for protecting the recording head against electrostatic discharge damage can be formed in the slider bodies. In this case, the embedded circuitry is formed at this stage in the process, generally near the surface of the wafer opposite the air bearing surface. The wafer is then diced into bars to expose what is to become the trailing surface of the slider bodies 332, which will receive the transducer bodies 342.

The transducer bodies 342 are prepared as in the other embodiments, by grinding to near finished stripe height. However, rather than being placed directly onto the trailing surface of the bars that contain linear arrays of slider bodies, as in the other embodiment, the transducer bodies are placed onto a separately prepared silicon wafer, prior to being positioned onto the slider bodies in the bars. The silicon wafer, which will become the silicon interlayer 310, is formed starting with a planar, standard silicon wafer. A series of oxidation, deposition and patterning steps are then performed to form a flexure device that will result in the flexure structures illustrated in FIGS. 6b, 6c and 7a. These steps are followed by an etch and deposition of permalloy closure bars 314 on the silicon interlayer wafer.

The wafer is then diced, and the assemblies that include the silicon interlayer 310 and the transducer bodies 342 are attached to the slider bodies 332. The transducer body chiplets are then attached using a eutectic or epoxy bonding method to secure the transducer body chiplets to the face of the diced wafer. Rotational and vertical alignment between the chiplet and interlayer wafer is done with fudicial marks placed during the processing of the interlayer wafer. The interlayer wafer is then diced into individual sections, with the transducer body chiplets attached thereto, and stretched onto blue tape, similar to that used in semiconductor processing. The assemblies that include the silicon interlayer 310 and the transducer bodies 342 are attached to the slider bodies 332 using epoxy or eutectic bonding, by aligning the fudicial marks of the bottom air bearing surface.

5. Controlling Transducer Element in X and Z Directions

Figure 17:
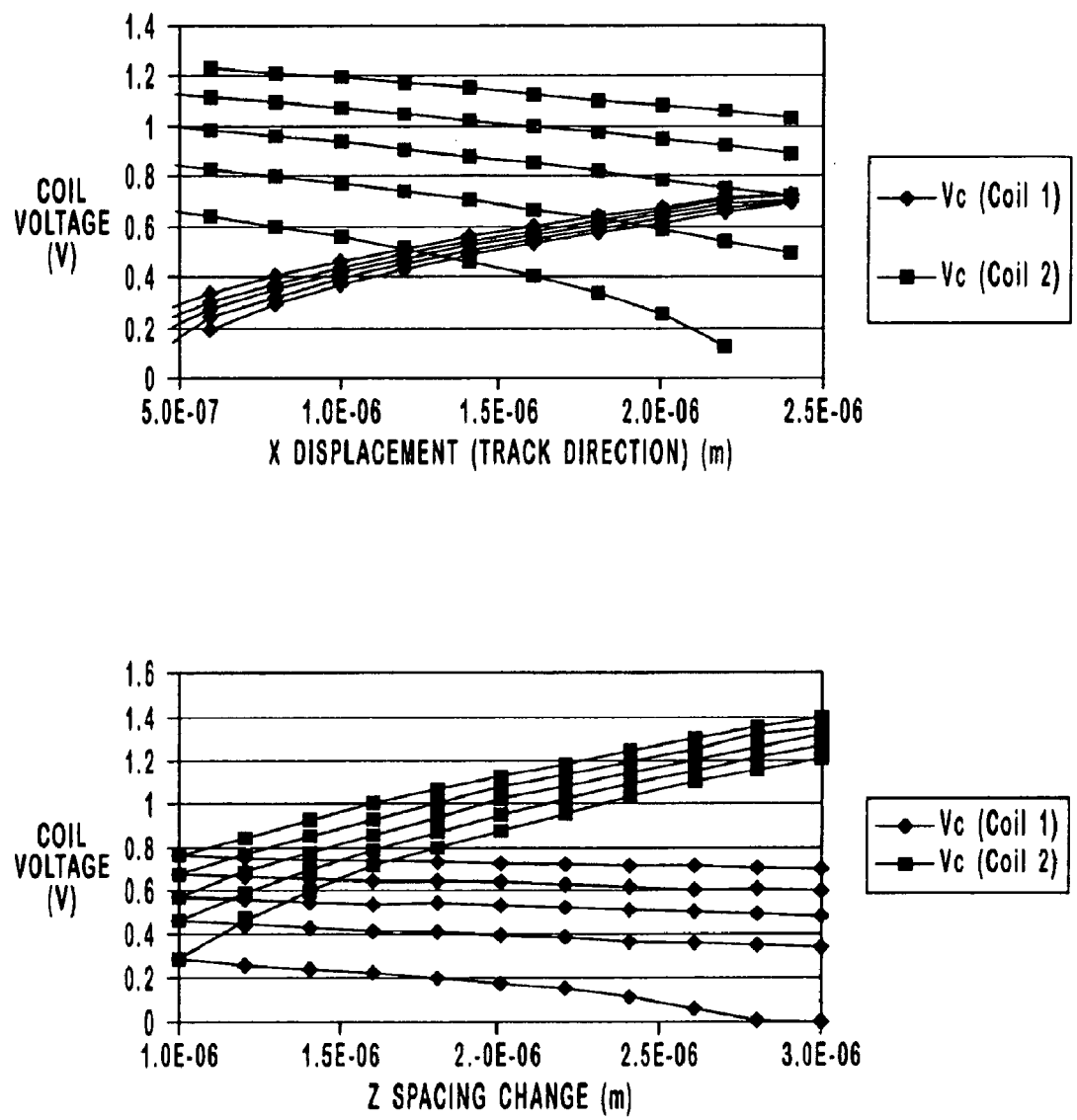
FIG. 17 depicts two graphs that illustrate the voltages applied to the toroidal coils that can be used in combination with the assembly of FIG. 2 to move the transducer in the x direction and z direction, respectively.

As noted above in reference to FIGS. 3a and 3b, the micropositioner coils 44 are displaced from the center of the transducer body 42 so as to produce a force on transducer body 42 that does not pass through the center of the transducer body. This offset of the micropositioner coils 44 permit the active portion of the transducer to be moved independently in the x direction and z direction by varying the voltages applied to the two coils 44. FIG. 17 includes two graphs that illustrate the different voltages that can be applied to the two coils 44 to achieve displacement in the x direction and the z direction, respectively. These graphs correspond to the recording head 40 of FIGS. 3a and 3b, which uses flexible posts 48 to permit motion of transducer body 42 with respect to slider body 32. Assuming the dimensions set forth in FIGS. 3a and 3b and coil resistances of about 3 ohms, the coil currents are under about 300 mA and the required voltages are approximately 1.0 to 1.5V.

The top graph in FIG. 17 shows the voltage changes required to hold the z position constant while adjusting the x position for actuating in the off-track direction while fixing the fly height. The bottom graph of FIG. 17 illustrates the voltage changes required to hold the x position constant while and adjust the z position, which results in changes to the fly height while fixing the transducer body over a data track. In both of these cases, the voltage and displacement ranges are sufficient to permit the desired operations, and the slopes of the curves are sufficient for the required resolution. The motion of the transducer bodies in the x direction can vary, depending on the nature of the components of the device. However, the transducer bodies often can move in the x direction by 5 to 10 tracks, which will increase as the track pitches continue to decrease. During operation, the nominal x and z positions of the transducer element as to, controlled by the micropositioner are such that the head is off-set to a intermediate position so that both directions of adjustment can be achieved.

Figure 18:
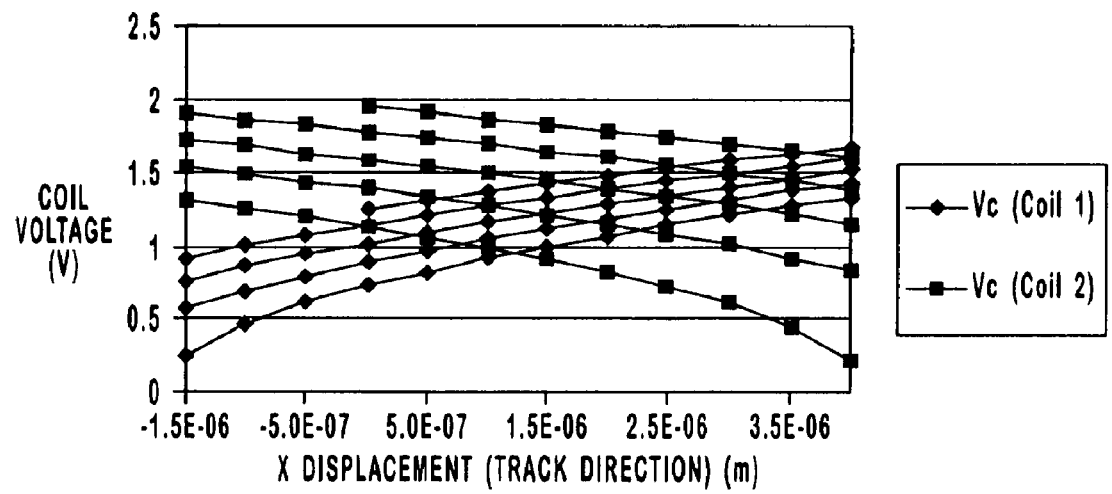
FIG. 18 depicts two graphs that illustrate the voltages applied to the toroidal coils that can be used in combination with the assembly of FIG. 4a to move the transducer in the x direction and z direction, respectively.
Figure 18:
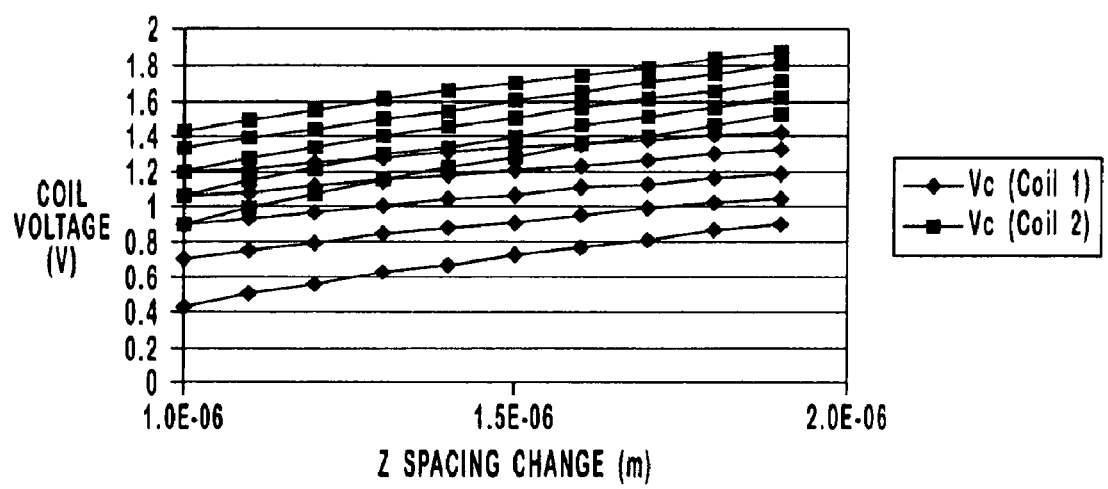

FIG. 18 likewise illustrates two graphs that show the different voltages that can be applied to the coils 44 of the recording head FIGS. 4a and 4b to achieve motion of the transducer in the x direction and z direction, respectively.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A recording head for use with a magnetic storage medium, the recording head structure comprising:
   a slider body having an actuator, wherein the actuator comprises:
      a first coil structure that generates a first magnetic flux; and
      a second coil structure that generates a second magnetic flux;
   a transducer body having a transducer, the transducer body being connected with the slider body such that the actuator is capable of moving the transducer with respect to the slider body by at least one of the first and second magnetic fluxes; and
   wherein the first coil structure and the second coil structure are offset from an axis of rotation of the transducer body in a z direction that is substantially perpendicular to an air bearing plane of the slider body.

2. The recording head of claim 1, wherein the actuator is capable of moving the transducer in an x direction substantially parallel to an air bearing plane of the slider body and in a z direction that is substantially perpendicular to the air bearing plane.

3. The recording head of claim 2, wherein the actuator is capable of moving the transducer independently in the x direction and in the z direction.

4. The recording head of claim 1, wherein the slider body is positioned at a free end of a head gimble assembly in a disk drive.

5. The recording head of claim 1, wherein the mass of the transducer body is sufficiently small and the flexure stiffnesses associated with the transducer body are sufficiently high that the transducer body has a minimum resonant frequency of greater than 30 kHz during recording head operation.

6. The recording head of claim 1, wherein:
   the slider body includes a trailing surface that defines a cavity having a plurality of flexible posts, each having a longitudinal axis that is substantially parallel to an air bearing plane of the slider body; and
   the transducer body is attached to the plurality of flexible posts.

7. The recording head of claim 1, wherein:
   the slider body includes a trailing surface having a plurality of flexures, the plurality of flexures defining a plane that is substantially parallel to the trailing surface; and
   the transducer body is attached to the plurality of flexures.

8. The recording head of claim 1, wherein:
   the slider body includes an air bearing surface and a magnetic coil structure positioned proximal to the air bearing surface;
   the transducer body is attached to a trailing surface of the slider body via a flexure; and
   the transducer body includes a magnetic closure bar that is selectively attracted by the magnetic coil structure to permit rotation of the transducer about an axis of rotation that is substantially parallel to the trailing surface and to the air bearing surface.

9. The recording head of claim 8, wherein the flexure is configured to bend about an axis that is substantially parallel to the trailing surface and to the air bearing surface and experiences torsion that permits motion of the transducer in an x direction that is substantially parallel to the air bearing plane.

10. The recording head of claim 1, wherein:
    the slider body includes an air bearing surface and magnetic actuators positioned proximal to the air bearing surface;
    the transducer body is attached to a trailing surface of the slider body; and
    the transducer body includes a pair of flexure members that experience bending about axes that are substantially perpendicular to the air bearing surface and experiencing torsion that permits motion of the transducer in an x direction that is substantially parallel to the air bearing plane.

11. A recording head for use with a magnetic storage medium the recording head structure comprising:
    a slider body, including:
       an actuator;
       an air bearing surface;
       a top surface opposite the air bearing surface; and
       magnetic actuators positioned proximal to the top surface; and
    a transducer body having a transducer, the transducer body being attached to a trailing surface of the slider body such that the actuator is capable of moving the transducer with respect to the slider body, wherein the transducer body includes a flexure structure that permits rotation of the transducer about an axis of rotation that is substantially parallel to the trailing surface and to the air bearing surface.

12. The recording head of claim 11, wherein the slider body includes embedded integrated circuitry for amplifying the read and write signals associated with the recording head.

13. The recording head of claim 11, wherein the slider body includes embedded circuitry for protecting the recording head from electrostatic discharge damage during and after manufacture of the recording head.

14. A recording head having a transducer that is capable of independent motion in two perpendicular directions with respect to a data storage medium, comprising:
    a slider body having an actuator assembly that includes at least two stationary magnetic actuators; and
    a transducer body having a transducer, the transducer body being connected with the slider body such that the actuator assembly is capable of moving the transducer with respect to the slider body and with respect to a data storage medium in an x direction substantially parallel to an air bearing plane of the slider body and in a z direction that is substantially perpendicular to the air bearing plane.

15. A recording head having a transducer that is capable of independent motion in two perpendicular directions with respect to a data storage medium, comprising:
    a slider body having an actuator assembly that includes at least two independently controllable magnetic actuators; and
    a transducer body having a transducer, the transducer body being connected with the slider body such that the actuator assembly is capable of moving the transducer with respect to the slider body and with respect to a data storage medium in an x direction substantially parallel to an air bearing plane of the slider body and in a z direction that is substantially perpendicular to the air bearing plane, wherein the transducer is interposed between the at least two independently controllable magnetic actuators.

16. A recording head having a transducer that is capable of independent motion in two perpendicular directions with respect to a data storage medium, comprising:

a slider body having an actuator assembly that includes at least two independently controllable magnetic actuators; and a transducer body having a transducer, the transducer body being connected with the slider body such that the actuator assembly is capable of moving the transducer with respect to the slider body and with respect to a data storage medium in an x direction substantially parallel to an air bearing plane of the slider body and in a z direction that is substantially perpendicular to the air bearing plane.

17. The recording head of claim 16, wherein the transducer body is connected with the slider body with at least one flexure structure that permits motion in the x direction and in the z direction.

18. The recording head of claim 16, wherein the transducer body is connected with the slider body by metal to metal bonding using at least one of heat and pressure.

19. The recording head of claim 18, wherein the metal to metal bonding uses a eutectic bonding composition.

20. The recording head of claim 18, wherein the metal to metal bonding uses a solder.

21. The recording head of claim 18, wherein the metal to metal bonding uses an epoxy that has been applied using a dispense control method for flowing the epoxy between the transducer body and the slider body.

22. The recording head of claim 16, wherein:
the transducer body is attached to the slider body using at least one flexure that includes:
a base silicon layer; and
a plurality of layers formed on the base silicon layer, the layers of the plurality of layers being formed from at least one of silicon, silicon nitride and silicon dioxide; and
the at least one flexure has been lithographically patterned using at least one or a wet etch and a dry etch.

23. A recording head having a transducer that is capable of independent motion in two perpendicular directions with respect to a data storage medium, comprising:
a slider body having an actuator assembly that includes at least two independently controllable magnetic actuators, wherein each of the magnetic actuators comprises:
a coil structure at one side of a gap; and
a mating closure bar at another side of the gap, wherein a force between the coil structure and the mating closure bar operates to reduce the gap; and
a transducer body having a transducer, the transducer body being connected with the slider body such that the actuator assembly is capable of moving the transducer with respect to the slider body and with respect to a data storage medium in an x direction substantially parallel to an air bearing plane of the slider body and in a z direction that is substantially perpendicular to the air bearing plane.

24. A method for controlling the position of a transducer of a recording head with respect to a data storage medium, the method comprising the acts of:
obtaining a disk drive having a recording head that includes:
a slider body having an actuator assembly, wherein the actuator assembly comprises at least a first magnetic actuator and a second magnetic actuator that are separately controllable; and
a transducer body having a transducer, the transducer body being connected with the slider body such that the actuator assembly is capable of moving the transducer with respect to the slider body; and
during operation of the disk drive, controlling the actuator assembly such that the transducer moves with respect to the slider body.

25. The method of claim 24, wherein the actuator assembly is capable of moving the transducer with respect to the slider body in an x direction substantially parallel to an air bearing plane of the slider body and in a z direction that is substantially perpendicular to the air bearing plane, the act of controlling the actuator assembly resulting in the transducer moving in at least one of the x direction and the z direction.

26. The method of claim 24, wherein the first magnetic actuator and the second magnetic actuator are offset from an axis of rotation of the transducer body in a z direction that is substantially perpendicular to an air bearing plane of the slider body.

27. The method of claim 24, further comprising the act of applying different voltages to the first magnetic actuator and the second magnetic actuator such that the transducer moves in the x direction without substantially moving in the z direction.

28. The method of claim 24, further comprising the act of applying different voltages to the first magnetic actuator and the second magnetic actuator such that the transducer moves in the z direction without substantially moving in the x direction.

29. The method of claim 24, wherein the transducer remains in a retracted position when no voltage is applied to the actuator assembly.

30. The method of claim 24, further comprising the acts of:
moving the transducer with respect to the slider body in the x direction without substantially moving the transducer in the z direction; and then
moving the transducer with respect to the slider body in the z direction without substantially moving the transducer in the x direction.

31. The method of claim 24, further comprising the act of using the actuator assembly to move the transducer in the x direction to position the transducer as desired with respect to a track in the data storage medium.

32. The method of claim 24, further comprising the act of using the actuator assembly to move the transducer in the z direction in response to a temperature measurement.

33. The method of claim 24, further comprising the act of using the actuator assembly to move the transducer in the z direction in response to a pressure measurement.

34. A recording head having an air bearing surface for maintaining a fly height between the recording head and a magnetic storage medium, the recording head structure comprising:
a slider body having an actuator assembly including a first magnetic actuator and a second magnetic actuator that are separately controllable; and
a transducer body having a transducer, the transducer body being connected with the slider body such that the actuator assembly is capable of moving the transducer in a z direction with respect to the slider body, the z direction being defined as the direction perpendicular to a surface of the magnetic storage medium when the recording head is used with the magnetic storage medium, each of the transducer body and the slider body has an air bearing surface that is adjacent to the surface of the magnetic storage medium when the recording head is used with the magnetic storage medium, wherein:

the air bearing surface of the transducer body has at least one region that is nearest to the surface of the magnetic storage medium and a recessed region; and the air bearing surface of the slider body has at least one region that is nearest to the surface of the magnetic storage medium and a recessed region.

35. The recording head of claim 34, wherein the air bearing surface of the transducer body is formed on a surface of the transducer body that is contoured such that an active region of the transducer remains at a minimum fly height during rotation of the transducer body.

36. The recording head of claim 34, wherein the at least one region of the air bearing surface of the transducer body that is nearest to the surface of the magnetic storage medium contains an active region of the transducer included in the transducer body, such that the active region is capable of maintaining a minimum fly height with respect to other regions of the transducer body.

37. The recording head of claim 34, wherein the air bearing surface of the transducer body and the air beating surface of the slider body arm such that moving the transducer body in the z direction with respect to the slider body and toward the surface of the magnetic storage medium during operation results in an increase in the fly height of the slider body near the trailing edge of the slider body.

* * * * *

UNITED STATES PATENT AND TRADEMARK OFFICE
CERTIFICATE OF CORRECTION

| | |
|---|---|
| PATENT NO. | : 6,859,346 B1 |
| APPLICATION NO. | : 10/342920 |
| DATED | : February 22, 2005 |
| INVENTOR(S) | : Dallas W. Meyer |

It is certified that error appears in the above-identified patent and that said Letters Patent is hereby corrected as shown below:

Column 2,
Line 56, change "HGA 14," to --HGAs 14,--

Column 5,
Line 44, change "FIG. 15a-15e" to --FIGS. 15a-15e--

Column 7,
Line 41, after "enable the" change "real" to --areal--

Column 8,
Line 37, change "transducer body." to --transducer body 42.--

Column 9,
Line 36, before "response to" insert --in--

Column 11,
Line 2, change "can selectively" to --can be selectively--
Line 6, after "interlayer 310" remove [z]
Line 64, before "with circuitry" change "turn" to --turn,--

Column 13,
Line 46, change "transducer body 42a" to --transducer body 42--
Line 66, change "in surface." to --therein.--

Column 14,
Line 28, change "when wafer" to --when the wafer--
Line 32, before "micropositioner coils 44." remove [a]
Line 44, after "recording heads" change "that" to --made using--

Column 15,
Line 49, change "that generally" to --that is generally--

Column 16,
Line 50, remove [By]

Column 17,
Line 44, after "bearing surface" change "according" to --according to--

UNITED STATES PATENT AND TRADEMARK OFFICE
CERTIFICATE OF CORRECTION

PATENT NO. : 6,859,346 B1
APPLICATION NO. : 10/342920
DATED : February 22, 2005
INVENTOR(S) : Dallas W. Meyer It is certified that error appears in the above-identified patent and that said Letters Patent is hereby corrected as shown below:

<u>Column 18,</u>
Line 23, before "the active portion" change "permit" to --permits--
Line 41, change "and adjust" to --adjusting--
Line 58, after "recording head" insert --of--

<u>Column 21,</u>
Line 36, after "at least one" change "or" to --of--

<u>Column 24,</u>
Line 7, change "air beating" to --air bearing--
Line 8, after "slider body" change "arm" to --are--

Signed and Sealed this

Fifth Day of February, 2008

JON W. DUDAS
*Director of the United States Patent and Trademark Office*